(12) United States Patent
Smith et al.

(10) Patent No.: US 12,211,182 B2
(45) Date of Patent: Jan. 28, 2025

(54) SCANNER NOISE ELIMINATION FOR SCANNED FILMS

(71) Applicant: Warner Bros. Entertainment Inc., Burbank, CA (US)

(72) Inventors: Michael Smith, Hermosa Beach, CA (US); Michael Zink, Altadena, CA (US); Christopher Nolan, Los Angeles, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 400 days.

(21) Appl. No.: 17/723,231

(22) Filed: Apr. 18, 2022

(65) Prior Publication Data

US 2022/0351336 A1    Nov. 3, 2022

Related U.S. Application Data

(63) Continuation of application No. PCT/US2020/056394, filed on Oct. 19, 2020.
(Continued)

(51) Int. Cl.
*G06T 5/70*      (2024.01)
*G06T 5/20*      (2006.01)

(52) U.S. Cl.
CPC .......... *G06T 5/70* (2024.01); *G06T 5/20* (2013.01); *G06T 2207/10008* (2013.01); *G06T 2207/10016* (2013.01)

(58) Field of Classification Search
CPC ... G06T 5/20; G06T 5/70; G06T 2207/10008; G06T 2207/10016; H04N 1/409
See application file for complete search history.

(56) References Cited

U.S. PATENT DOCUMENTS

| | | | | |
|---|---|---|---|---|
| 5,641,596 A | * | 6/1997 | Gray ........................ | G06T 5/20 430/21 |
| 2003/0002744 A1 | * | 1/2003 | Lopez-Estrada ......... | G06T 5/70 382/254 |
| 2006/0245002 A1 | | 11/2006 | Kita | |

FOREIGN PATENT DOCUMENTS

| | | |
|---|---|---|
| JP | 2007026232 A | 2/2007 |
| JP | 4012720 B2 | 11/2007 |

(Continued)

OTHER PUBLICATIONS

Gou, et al. (Intrinsic Sensor Noise Features for Forensic Analysis on Scanners and Scanned images), pp. 1-16. (Year: 2009).*
(Continued)

*Primary Examiner* — Daniel G Mariam
(74) *Attorney, Agent, or Firm* — Bookoff McAndrews, PLLC

(57) ABSTRACT

A method for preparing digital image data from an analog image input by scanning, and reducing visibility of the scanning noise, may include estimating a visibility of scanning noise, and a number of scanning samples needed to reduce scanning noise to below a visible threshold. Related methods include scanning, by an analog-to-digital image scanner, an analog image for multiple iterations, resulting in digital image data for each of the iterations; calculating a noise statistic for individual pixels of digital image data across the iterations; determining true values of individual pixels of the digital image data based on the noise statistic for each of the individual pixels and generating scanner noise reduced digital image data wherein pixels are assigned their respective ones of the true values; and saving the scanner noise reduced digital image data in a computer memory.

20 Claims, 23 Drawing Sheets

Related U.S. Application Data

(60) Provisional application No. 62/923,392, filed on Oct. 18, 2019.

(56) References Cited

FOREIGN PATENT DOCUMENTS

| KR | 1020070040026 | 4/2007 |
|----|---------------|--------|
| KR | 1020180090697 | 8/2018 |

OTHER PUBLICATIONS

Peter D. Burns and Don Williams, "Identification of Image Noise Sources in Digital Scanner Evaluation", Proc. SPIE-IS&T Electronic Imaging Symposium, SPIE vol. 5294, p. 114-123, 2004).

* cited by examiner

FIG. 11B ⤺1100
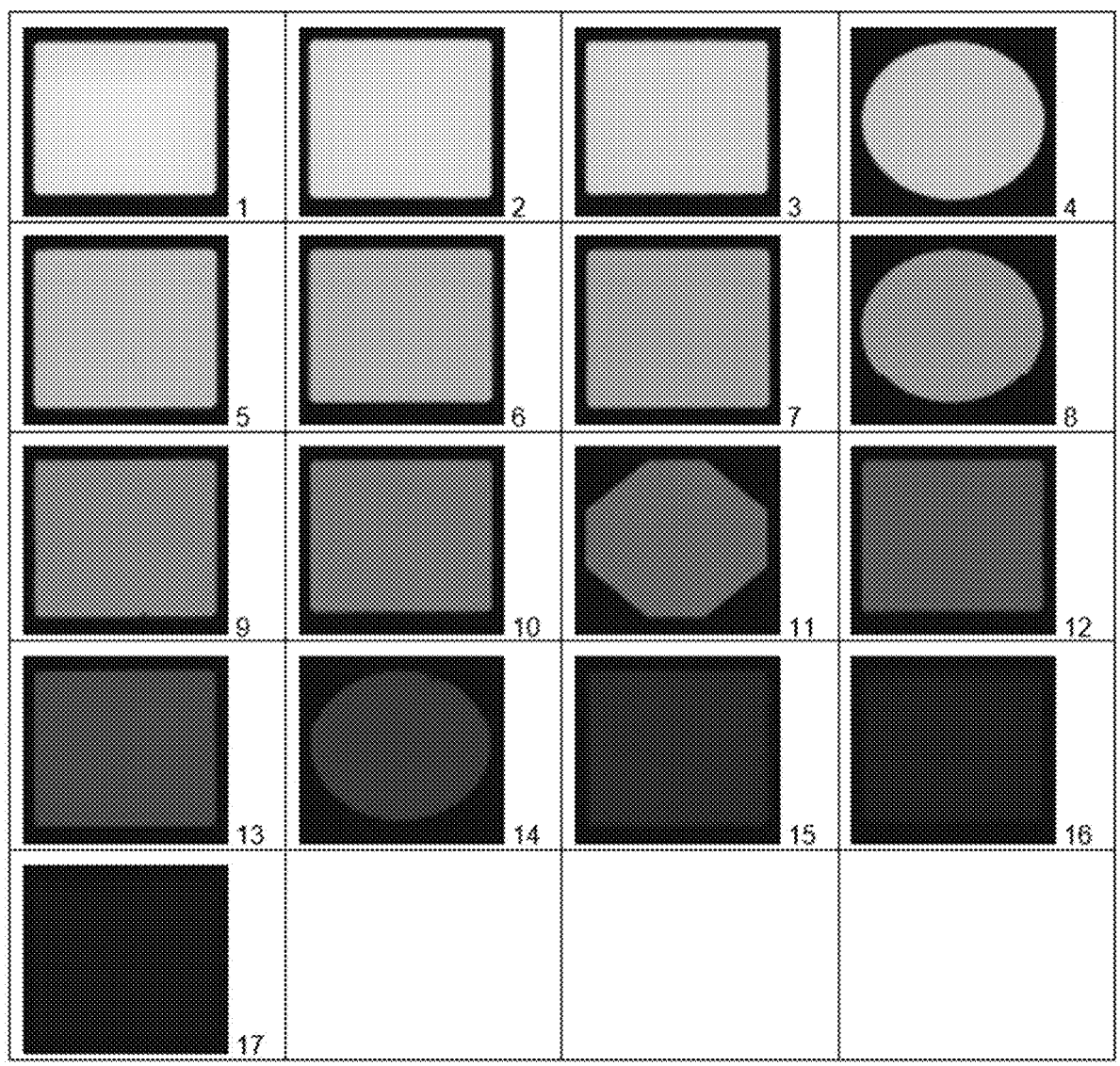

FIG. 14 ⤶ 1400
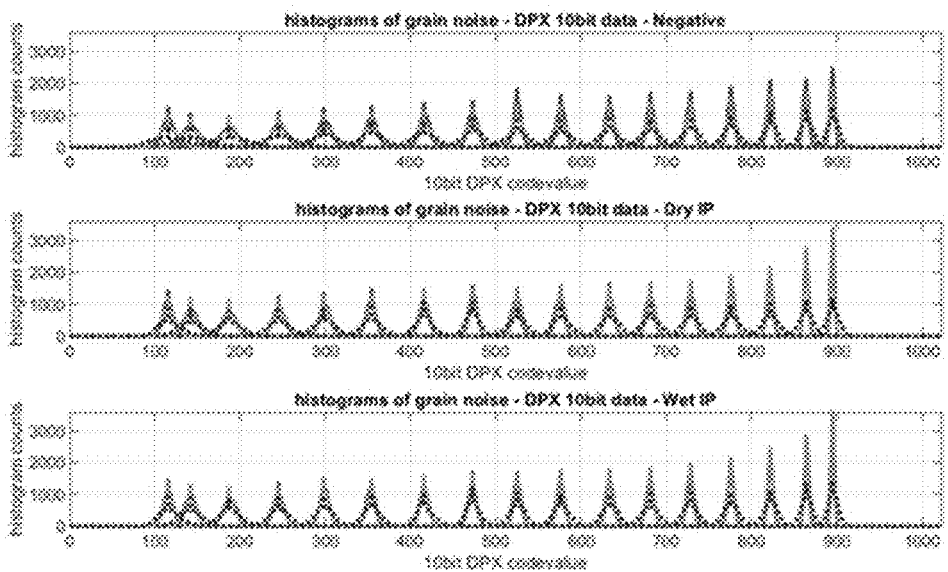
FIG. 15 ⤶ 1500
Table 1 – Patch codevalue to Luminance mapping
| patch number | 10bit DPX codevalue | SDR Luminance (nits) | HDR Luminance (nits) |
|---|---|---|---|
| 1 | 895 | 96.3 | 459.6 |
| 2 | 864 | 94.3 | 401.7 |
| 3 | 822 | 90.8 | 327.3 |
| 4 | 776 | 85.7 | 253.9 |
| 5 | 729 | 78.9 | 189.7 |
| 6 | 681 | 69.9 | 136.1 |
| 7 | 633 | 58.0 | 93.9 |
| 8 | 576 | 40.5 | 57.4 |
| 9 | 525 | 25.6 | 35.3 |
| 10 | 473 | 14.7 | 20.5 |
| 11 | 416 | 7.18 | 10.7 |
| 12 | 354 | 3.12 | 4.77 |
| 13 | 298 | 1.38 | 2.13 |
| 14 | 245 | 0.623 | 0.977 |
| 15 | 187 | 0.203 | 0.32 |
| 16 | 142 | 0.061 | 0.097 |
| 17 | 116 | 0.012 | 0.034 |

FIG. 23 ← 2300

| Table 2 - JNDs of Noise Reduction due to scanner noise removal ||||||
|---|---|---|---|---|---|
| | SDR Output ||| HDR Output |||
| Patch Number | Negative | Dry IP | Wet IP | Negative | Dry IP | Wet IP |
| 1 | 0.2 | 0.1 | 0.1 | 2.0 | 0.5 | 0.5 |
| 2 | 0.2 | 0.1 | 0.1 | 1.7 | 0.5 | 0.5 |
| 3 | 0.2 | 0.1 | 0.1 | 1.5 | 0.5 | 0.5 |
| 4 | 0.2 | 0.1 | 0.1 | 1.4 | 0.5 | 0.6 |
| 5 | 0.3 | 0.2 | 0.2 | 1.2 | 0.6 | 0.6 |
| 6 | 0.3 | 0.2 | 0.3 | 1.0 | 0.6 | 0.7 |
| 7 | 0.4 | 0.5 | 0.5 | 1.0 | 0.9 | 0.9 |
| 8 | 0.6 | 0.9 | 1.0 | 0.8 | 1.1 | 1.1 |
| 9 | 0.9 | 1.3 | 1.4 | 0.9 | 1.3 | 1.4 |
| 10 | 2.0 | 1.0 | 1.0 | 1.9 | 1.0 | 0.9 |
| 11 | 1.8 | 1.0 | 1.1 | 1.7 | 1.0 | 1.0 |
| 12 | 1.0 | 1.0 | 1.1 | 1.1 | 1.0 | 1.1 |
| 13 | 0.7 | 0.0 | 0.0 | 0.7 | 0.1 | 0.0 |
| 14 | 0.4 | 0.0 | 0.0 | 0.4 | 0.0 | 0.0 |
| 15 | 0.2 | 0.0 | 0.0 | 0.3 | 0.0 | 0.0 |
| 16 | 0.2 | 0.0 | 0.0 | 0.3 | 0.0 | 0.0 |
| 17 | 0.0 | 0.0 | 0.0 | 0.1 | 0.0 | 0.0 |

FIG. 24 ← 2400

| | Negative | Dry IP | Wet IP |
|---|---|---|---|
| Grain Noise from Strip 1 Patch 10 | | | |
| Scanner Noise and Grain Noise from Scan 1 Strip 1 Patch 10 | | | |
| Scanner Noise from Strip 1 Patch 10 Scan 1 | | | |

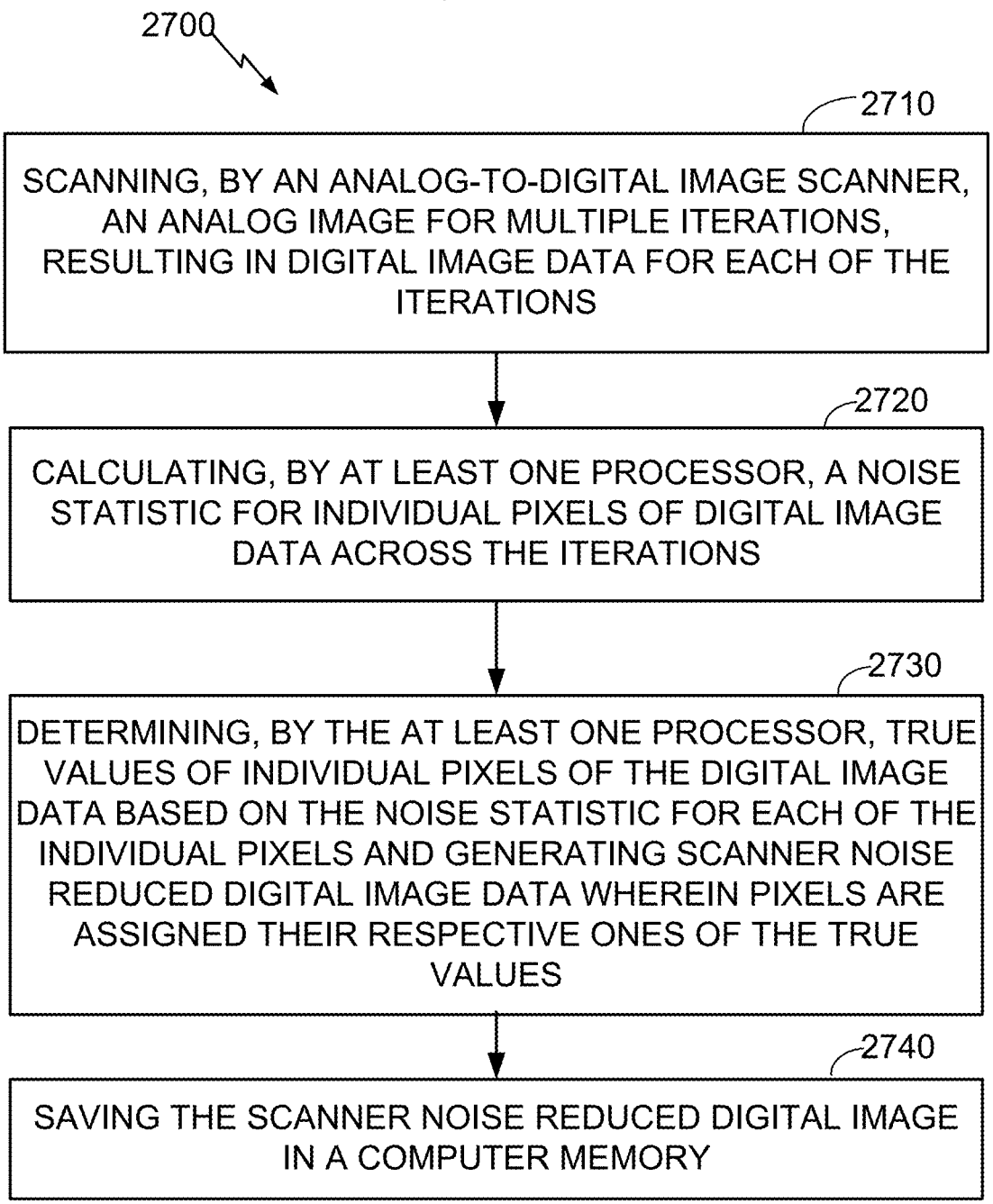

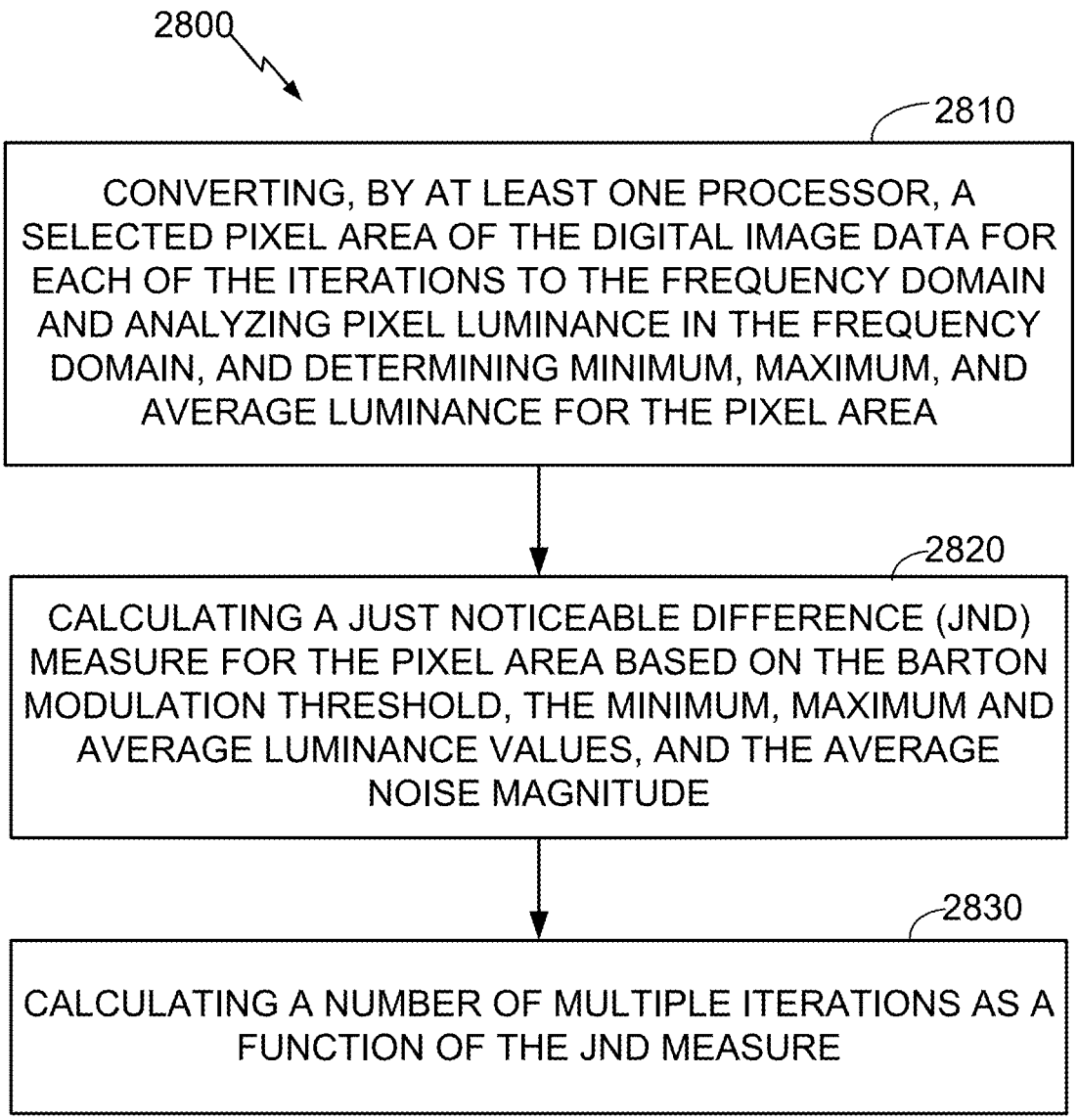

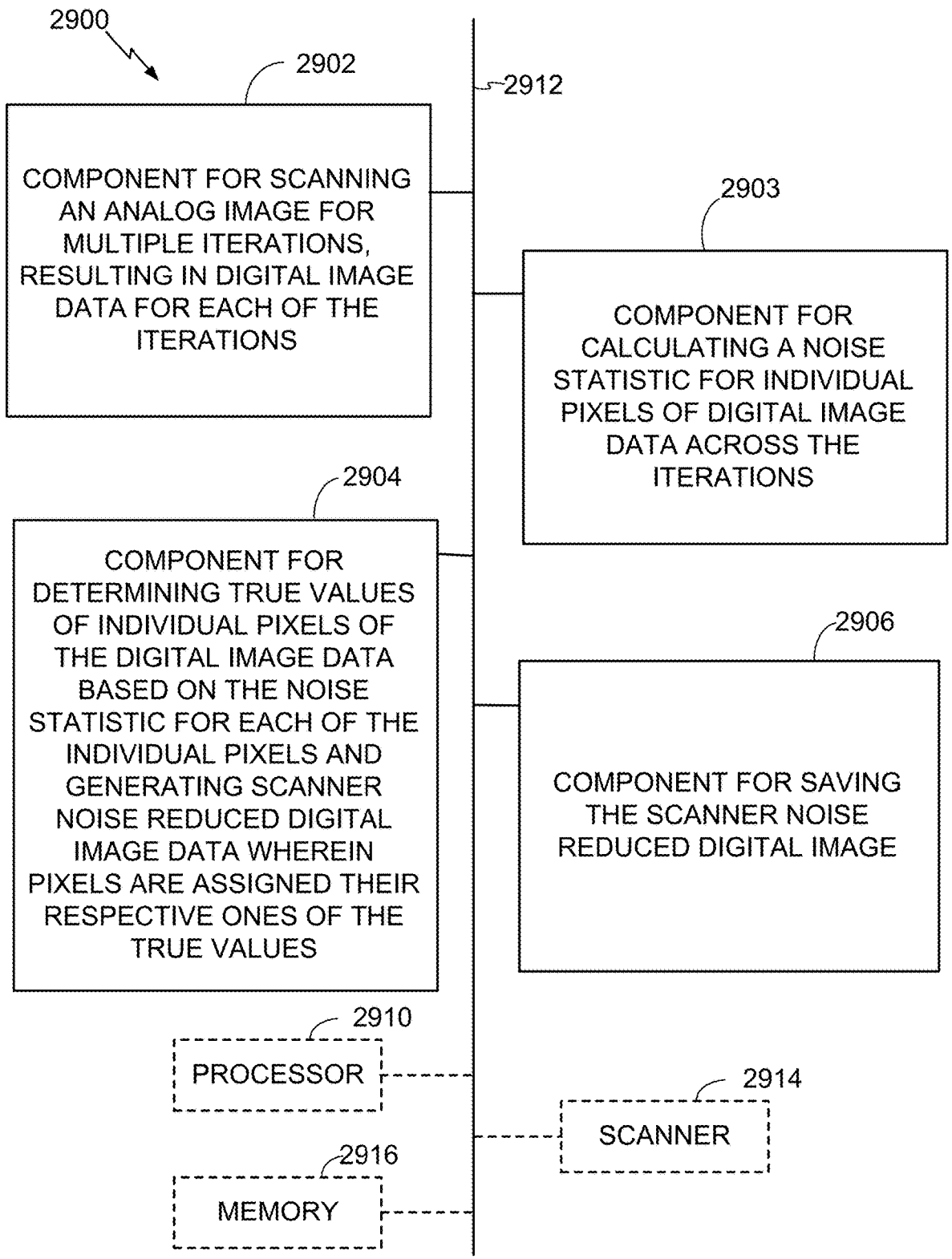

SCANNER NOISE ELIMINATION FOR SCANNED FILMS

PRIORITY CLAIM

The present application is a continuation of International Patent Application No. PCT/US20/56394, filed Oct. 19, 2020, which claims priority to U.S. Provisional Patent Application Ser. No. 62/923,392 filed Oct. 18, 2019, both of which are incorporated herein in their entirety by reference.

FIELD

The present application relates to methods, systems and apparatus for reducing scanner noise in scanned images for various applications, for example, for digital video conversion of motion picture film and other analog video formats.

BACKGROUND

Film scanning is used in both modern film production and remastering workflows to convert the analog medium of film to a digital format. The film scanning process itself can introduce scanner noise into the digital image which has different characteristics than the more familiar film grain noise. Film grain noise is inherent in the physical film medium itself and its visibility and characteristics vary based on the film format and the type of film used. Filmmakers often consider the characteristics of film grain as a visual aesthetic that can be leveraged creatively to enhance the storytelling.

Scanning different types of film elements (e.g. negatives and IPs) in different film scanners with different scan settings can lead to different results. The visibility of these differences change when the scan is used to create an SDR Home Master or SDR Cinema release versus an HDR Home Master due to the increased luminance and contrast often associated with the HDR format. In at least some cases, the scanner noise may be noticeable in the finished product. However, methods for eliminating scanner noise to below visual perception are lacking for certain film formats, for example HDR. Therefore, current techniques for film production may sometime result in distracting artifacts of scanner noise to be noticeable by the viewer.

It would be desirable, therefore, to develop new methods and other new technologies for film scanning and conversion of video from analog to digital formats, that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a programmable scanner for reducing scanner noise may be configured to obtain multiple scans of a frame of film, obtain a noise statistic of a pixel of the frame across the multiple scans, determine true values of individual pixels of the digital image data based on the noise statistic for each of the individual pixels, generate scanner noise reduced digital image data for the frame image wherein pixels are assigned their respective ones of the true values, and store the digital image data having one or more pixels with reduced scanner noise in a memory associated with the scanner if the scanner noise is below a visibility threshold.

In an aspect of the method and apparatus, the noise statistic comprises a median, or an average.

The scanner may be configured to obtain an additional number of scans of the frame of film if the scanner noise of the pixel is not below a threshold.

The scanner may similarly scan and process a sequence of frames to reduce scanner noise across any frame sequence. A frame sequence may be converted to any desired digital video format after reduction of scanner noise.

As used herein, a computer processor may include, for example, a microprocessor, microcontroller, system on a chip, or other processing circuit. As used herein, a "processor" means a computer processor.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 11B shows thumbnails cropped to 17 different individual files per strip.

FIGS. 12-14 are histograms of 128×128 pixel areas of a single scan of each of 45 different strips and same patch, illustrating the variance of various pixel values.

FIG. 15 is a table showing describes relationships between patch number, ADX10 10 bit codevalue and HDR/SDR output luminance.

FIG. 23 is a table comparing JNDs of noise reduction for various patches.

FIG. 24 compares appearances of various noise types for different film types.

FIG. 27 is a flow chart illustrating aspects of a method for preparing digital image data from an analog image input.

FIG. 28 is a flow chart illustrating aspects of a method for determining visibility of scanner noise.

FIG. 29 is a conceptual block diagram illustrating components of an apparatus or system for methods described herein.

DETAILED DESCRIPTION

Figure 1:
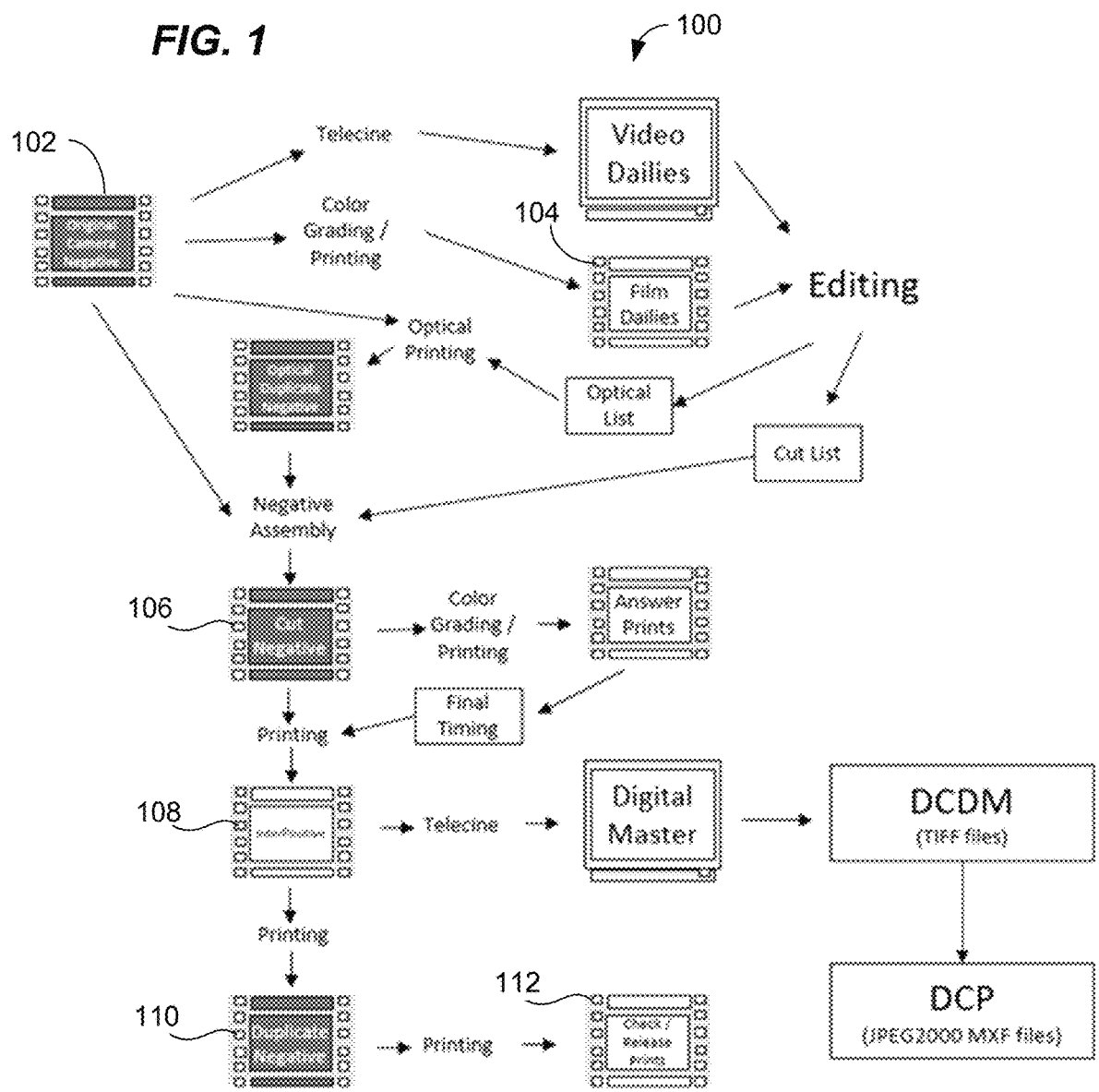
FIG. 1 is a schematic diagram illustrating a traditional workflow for converting analog motion picture file to digital video data.

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are represented in block diagram form to facilitate focus on novel aspects of the present disclosure.

While physical film prints are not widely used for motion picture distribution due to the industry's successful transition to digital cinema distribution, negative film and interpositive (IP) film are still frequently used as a source for motion picture releases in High Dynamic Range (HDR) and Standard Dynamic Range (SDR) formats. Modern productions that use film as the acquisition format typically scan the film negative in a film scanner and then use modern digital production processes such as visual effects, editing and color grading like modern digital camera workflows. Remastering projects leverage the thousands of film negatives and IPs that are stored in Hollywood studios' vaults to create new versions of older titles. IPs were created in traditional photochemical film workflows and are often available for use in remastering projects.

Film scanning is a critical step in both modern film production and remastering workflows as it converts the analog medium of film to a digital format. The film scanning process itself can introduce scanner noise into the digital image which has different characteristics than the more familiar film grain noise. Film grain noise is inherent in the physical film medium itself and its visibility and characteristics vary based on the film format and the type of film used. Filmmakers often consider the characteristics of film grain as a visual aesthetic that can be leveraged creatively to enhance the storytelling. Traditional photochemical film workflows that did not use film scanners also were impacted by film grain noise.

Scanning different types of film elements (e.g. negatives and IPs) in different film scanners with different scan settings can lead to different results. The visibility of these differences change when the scan is used to create an SDR Home Master or SDR Cinema release versus an HDR Home Master due to the increased luminance and contrast often associated with the HDR format. The present disclosure quantifies these differences and explains the visual impact of film grain versus scanner noise with an emphasis on HDR video and methods for mitigating scanner noise. The disclosure further describes recent experiments with test films. Although the inventors have observed and captured visual examples of scanner noise and film grain noise, limitations of print media limit the ability to present the most compelling examples.

In this disclosure, results of a detailed analysis of film scanner and film grain noise are presented and impact on visibility for SDR and HDR output formats is examined. Scanner noise is eliminated by taking the median across each pixel in multiple scans of the same piece of film. For example, in the tests described herein, scanner noise had a significant affect in all 17 patches for HDR targets and eliminating scanner noise in the HDR targets resulted in approximately 1-2 JNDs worth of noise reduction. Scanner noise had a lesser effect on SDR targets, for example the brightest patches had no visible scanner noise in SDR targets, but for the several patches in which scanner noise was visible in SDR targets, its elimination resulted in approximately 0.5 to 2 JNDs worth of noise reduction. Scanning an IP instead of the Negative is an alternative way to reduce scanner noise in the HDR outputs. Furthermore, scanning the IP compared to the Negative also reduces the grain noise by 0.5 JND and 1.0 JND for dry IP and wet IP compared to the Negative in HDR outputs.

The present technology operations under certain conditions, including: (1) the analog film to be converted contains film-grain noise; (2) film scanners introduce scanner-noise when they scan film; and (3) every film scan likely contains noise that is a result of both film-grain and scanner-noise.

Solutions are described herein arose out of careful study of the visual impact of film-grain separately from the visual impact of scanner-noise. Characterizing film-grain separately from scanner-noise when every film scan contains both types of noise presents perceptual and technical challenges. Goals include determining whether the film-grain and scanner-noise have a dependence on the density of the film.

To obtain an approximation of a film scan without scanner noise, the same piece of film is scanned multiple times, and the multiple scans are averaged together, which should reduce or eliminate scanner noise. The averaged result will contain film grain noise without scanner noise, referred to herein as a scanner noise free value, which can be computer for every pixel in the image. The average may be a simple average, median, or other useful measure appropriate for the scanner and measurement conditions. An average of the scan values may be most representative of the scanner noise free value when the scan values are evenly distributed around an average value, for example, when alignment between scans is perfect or nearly perfect, the scan data does not include outliers, and the film is clear and free of dust or similar variable imperfections. When the scan data shows the existence of less perfect conditions, for example, misalignment, dust, or outliers in scan results, then the median value may be more representative of the true, scanner noise free pixel value.

An estimate of scanner noise may be useful for understanding visibility of the noise to a human subject. To obtain just the scanner noise alone, an image processor subtracts the average of the multiple scans from a single scan. For example, assuming scan 1 pixel(x,y) has value=true_value(x,y)+noise_a(x,y), scan 2 pixel(x,y) has value=true_value(x,y)+noise_b(x,y), scan 3 pixel(x,y) has value=true_value(x,y)+noise_c(x,y), and scan 4 pixel(x,y) has value=true_value(x,y) noise_d(x,y), then an average of scan 1-4 is give by pixel(x,y)=true_value(x,y)+[noise_a(x,y)+noise_b(x,y)+noise_c(x,y)+noise_d(x,y)]/4. Assuming scanner noise(x,y) is zero mean, its average value goes to 0 as more samples are averaged together. Subtracting the average-of-scans 1-4 from scan 1 gives an estimate of the noise in scan 1, but not its true value: {true_value(x,y)+noise_a(x,y)}−{true_value(x,y)+[noise_a(x,y)+noise_b(x,y)+noise_c(x,y)+noise_d(x,y)]/4}={(3/4)*noise_a(x,y)}−[noise_b(x,y)+noise_c(x,y)+noise_d(x,y)]/4}. For 'n' number of iterations each providing a noise sample, the latter expression for scanner noise per pixel becomes $$\frac{(n-1)}{n}noise\_1(x, y) - \frac{\sum_{2}^{n}noise\_n(x, y)}{n}.$$

After characterizing the noise in the scans, the processor uses the Academy's ACES transforms to model the transformation of film scan data (as ADX10) into output luminance for various SDR and HDR delivery formats. The variations in the scan data due to film grain and scanner noise can then be translated into variations in output luminance, which can be further translated into estimates of visibility using the Barten model.

Film's use in Motion Pictures: Film has been intertwined with the motion picture industry since its inception and it remains relevant today even though digital technologies have replaced much of its use. While digital acquisition, post-production and distribution has replaced much of the use of physical film, film continues to be used as an acquisition format for many modern motion picture productions. Film is also frequently used for remastering projects in which new versions of older titles are created for distribution. Ongoing digitization for preservation efforts also involve scanning of film archives. As technological background, summaries of common traditional and modern workflows for film productions are shown in FIGS. 1 and 2.

FIG. 1 is a conceptual diagram showing a traditional photochemical film workflow 100. During production, the original camera negative (OCN) 102 is exposed on set using a film camera. Various takes of the same shot are acquired on multiple reels of camera negative. The camera negatives are sent to the film processing lab for developing, and dailies prints 104 are made for dailies review. The selected takes are identified, and a cut negative 106 is assembled that contains the frames from the corresponding selections of the original camera negative 102. The cut negative is used to create an Interpositive (IP) 108 that has been color timed to adjust color balance, exposure and contrast. Color Separations may also be created from the cut negative on Black & White intermediate stock as a protection/archiving element. The IP is used to create an Internegative (IN) (aka Duplicate Negative) 110 for creating the Release Prints 112. There were often several IPs and INs created for films with wide releases.

Figure 2:
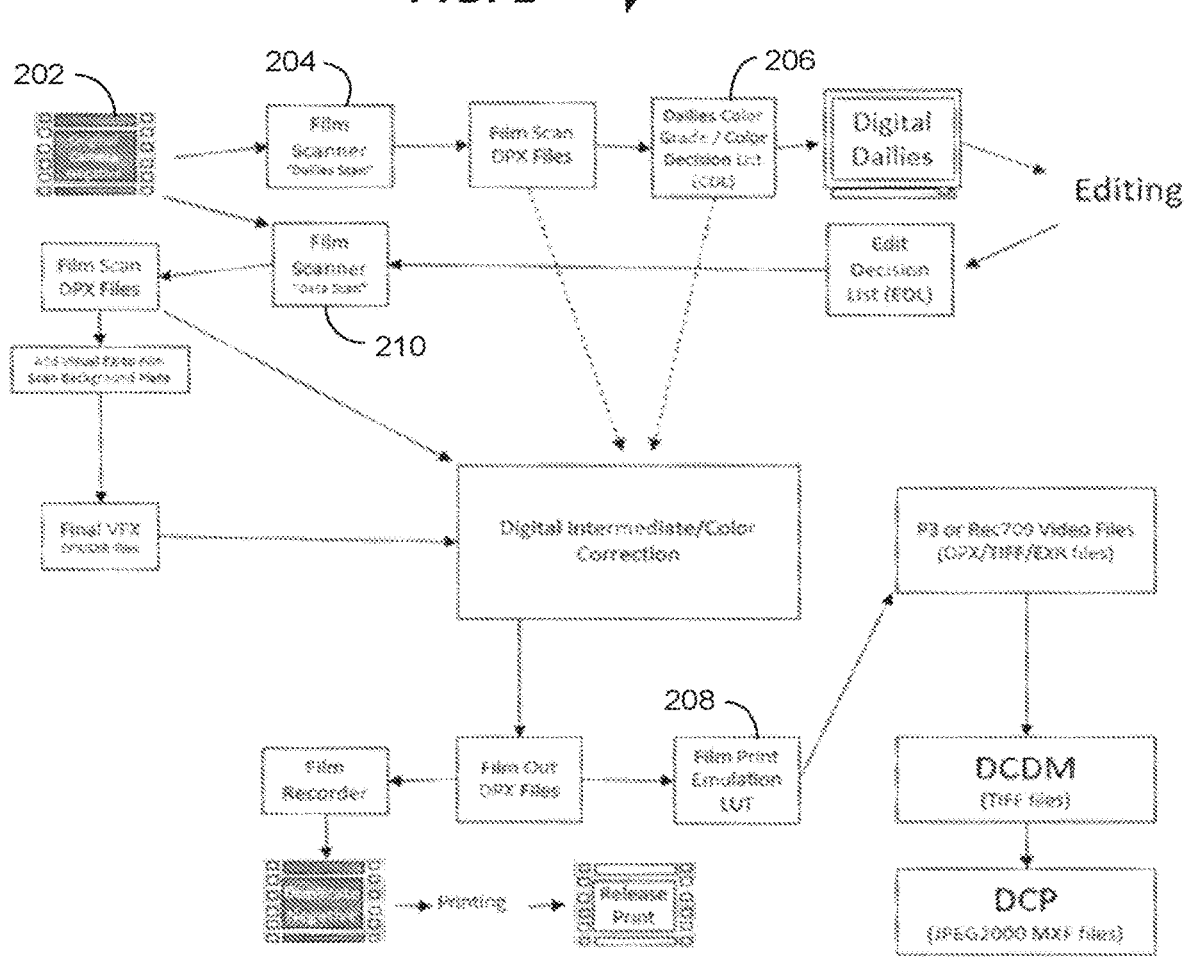
FIG. 2 is a schematic diagram illustrating a modern workflow for converting analog motion picture file to digital video data.

FIG. 2 is a conceptual diagram showing a modern film workflow 200. During production, the original camera negative 202 is exposed on set using a film camera. Various takes of the same shot are acquired on multiple reels of camera negative. The camera negatives are sent to the film processing lab for developing, and the developed negative is scanned 204 for dailies review. A dailies colorist may perform color correction 206 using different CDL values for each shot. The Dailies CDLs are often used throughout the post-production pipeline until a final color correction is performed. Modern film workflows also utilize a Show LUT 208 that is applied after the Dailies CDL or color correction to convert the film density scan information into a video signal for display. The Show LUT varies from title to title and often includes film print emulation and/or other creative looks. Depending on the production's budget and schedule, the selected shots from the dailies that made the cut and are referenced in the EDL may be rescanned at higher resolution or higher quality 210.

As evident from inspections of workflows 100 and 200, the source image goes through various transformation steps on its way to ultimately being shown as a final image to the viewer. Visibility of changes in the source image data may be of special concern for HDR images, but should also be understood for SDR. The visibility of noise in the source image can be analyzed by considering the various transformation steps in the relevant workflow. The ACES framework provides a baseline set of such transforms and is used for this analysis; however, other frameworks may also be suitable. The final transformation from acquired source image to the displayed image seen by the viewer is almost always adjusted further beyond the baseline set of transforms for creative reasons via color correction, and these adjustments vary title by title.

Figure 3:
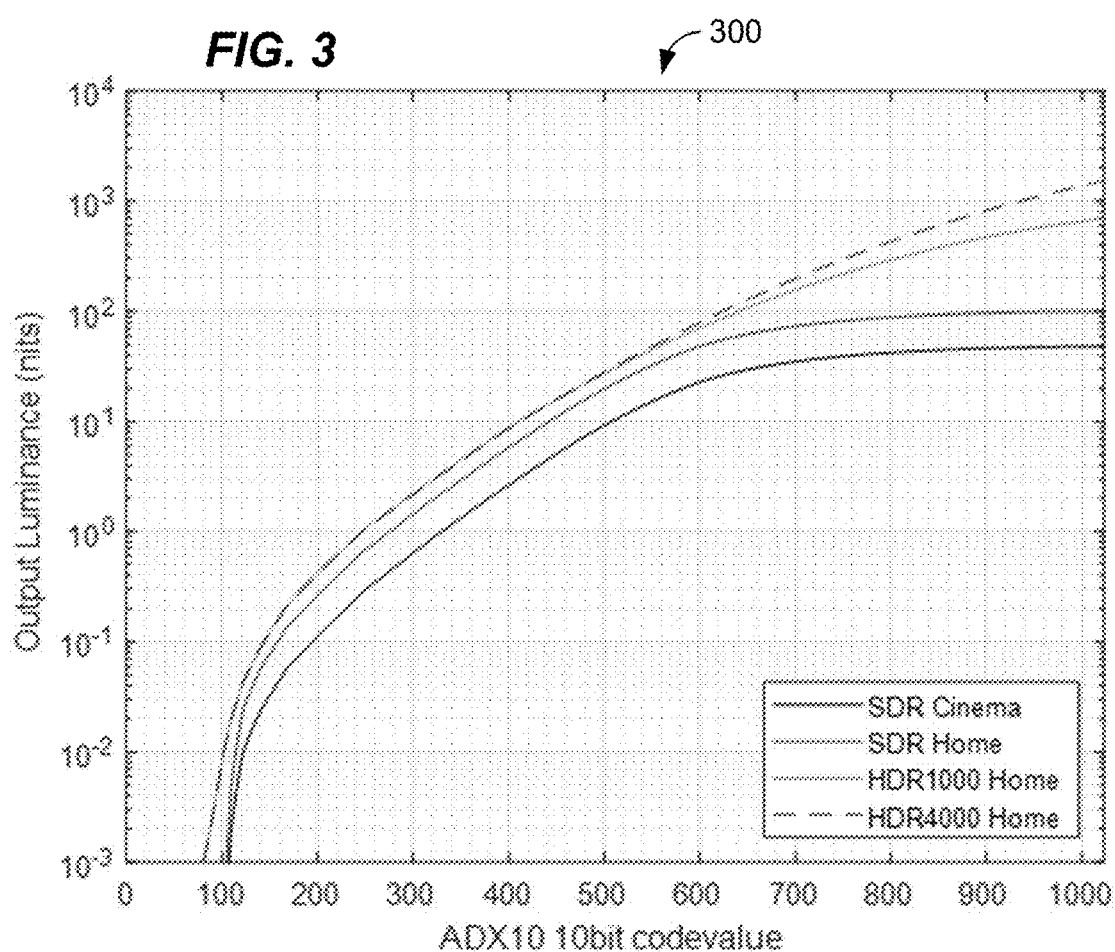
FIG. 3 is a chart comparing luminance and ADX10 code values for various digital video standards.

FIG. 3 is a graph 300 illustrating a relationship between output luminance of the ACES 1.1 transforms resulting from a 10 bit ADX10 film scan input for various output targets such as SDR Cinema, SDR BT.709 Home Video, and UHD HDR BT.2100 Home Video (with both 1000-nits and 4000-nits targets). As expected, luminance for HDR formats is generally higher than for SDR formats, for the same code value.

Scanner outputs may cause small per-pixel variations in ADX10 codevalues given the same input at different times. If the image data changes by a single 10 bit codevalue in the ADX10 Film Scan source image, it will have a different visibility impact, depending on the codevalue itself and the transformations used to create the final displayed image. For example, for SDR Home outputs, the luminance of ADX10 codevalue 800 and 801 correspond to output luminance 88.5 nits and 88.6 nits respectively, while for HDR 1000 Home outputs, the same codevalues result in 291 nits and 292 nits respectively. The resulting Michelson Contrast (aka Modulation)=(Lmax−Lmin)/(Lmax+Lmin) for those two different output targets is 0.0006 and 0.002 respectively, and these two different contrasts can be compared to the Just Noticeable Difference (JND) thresholds provided by the Barten Contrast Sensitivity Function (CSF) model to estimate the contrast visibility. The inverse of the Barten CSF sensitivity is the Modulation Detection Threshold, calculated simply as 1/sensitivity.

Figure 4:
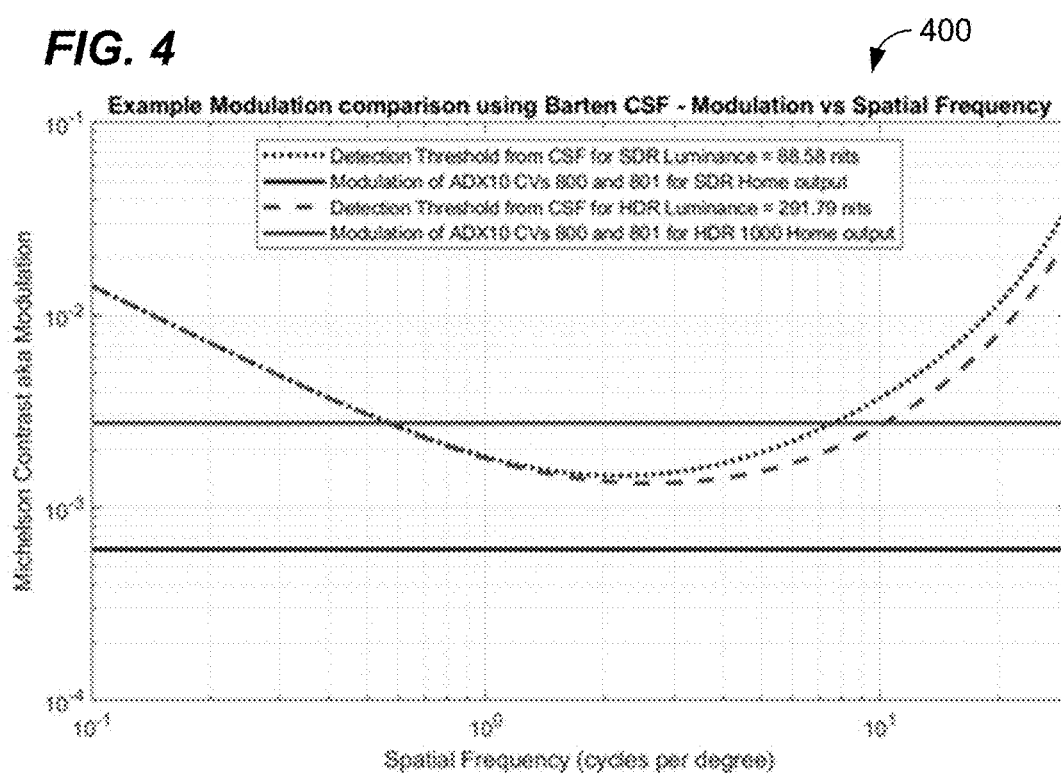
FIG. 4 is a chart comparing modulation using Barton CSF to spatial frequency.

The graph 400 of FIG. 4 compares the modulation that results for the example ADX10 codevalues 800 and 801 for SDR and HDR output targets to the modulation thresholds for the corresponding average luminance. The modulation of ADX10 codevalues 800 and 801 for SDR Home output (with average luminance 88.58 nits) is about 0.0006 and below the Detection Threshold derived from the Barten CSF across all spatial frequencies, which means that a change in the source image ADX10 data from codevalue 800 to 801 (or from 801 to 800) will not be visible for the SDR Home output for any image structure. The same ADX10 codevalues for the HDR output (with average luminance 291.79 nits) results in a modulation of about 0.002 that is both above the Detection Threshold derived from the CSF and below the Detection Threshold. If the corresponding image structure contains very high frequencies (above 10 cycles per degree) or very low frequencies (below 0.5 cycles per degree) then the change from codevalue 800 to 801 will not be visible, otherwise it will be visible. In other words, for spatial frequencies between 0.5 cycles per degree and 10 cycles per degree, the change may be visible.

Figure 5:
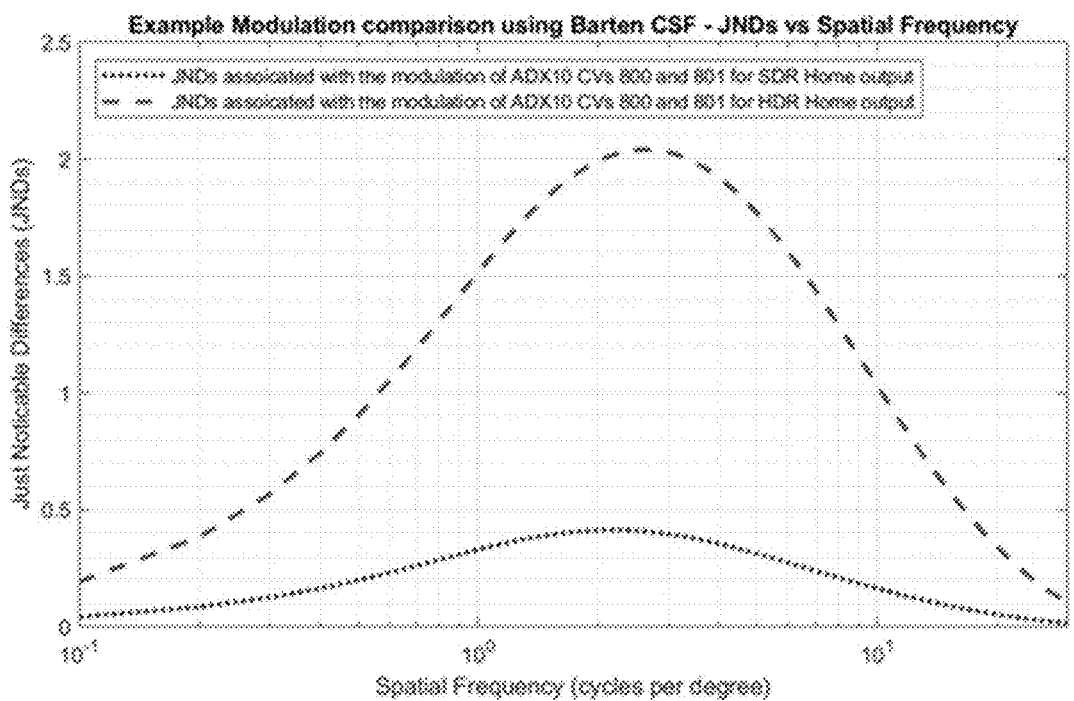
FIG. 5 is a chart comparing modulation using Barton CSF JNDs to spatial frequency.

The graph 500 of FIG. 5 shows an alternative way of representing the same relationship between the Detection Threshold and a modulation, by calculating the ratio between the modulation being evaluated versus the detection threshold derived from the Barten CSF. The units of this ratio are often referred to as Just Noticeable Differences (JNDs). If the ratio is less than 1 JND, then the modulation will not be visible. The corresponding JNDs for the same codevalue 800 to 801 comparison are shown below, illustrating the dependence on spatial frequency. Visibility is indicated between about 0.5 and 10 cycles per degree, as noted above. For the graph 500, the SDR modulation is not visible as it is below 1 JND for all frequencies while the HDR modulation may be visible if image structure has frequencies between 0.5 to 10 cycles per degree where the HDR modulation is above 1 JND.

Figure 6:
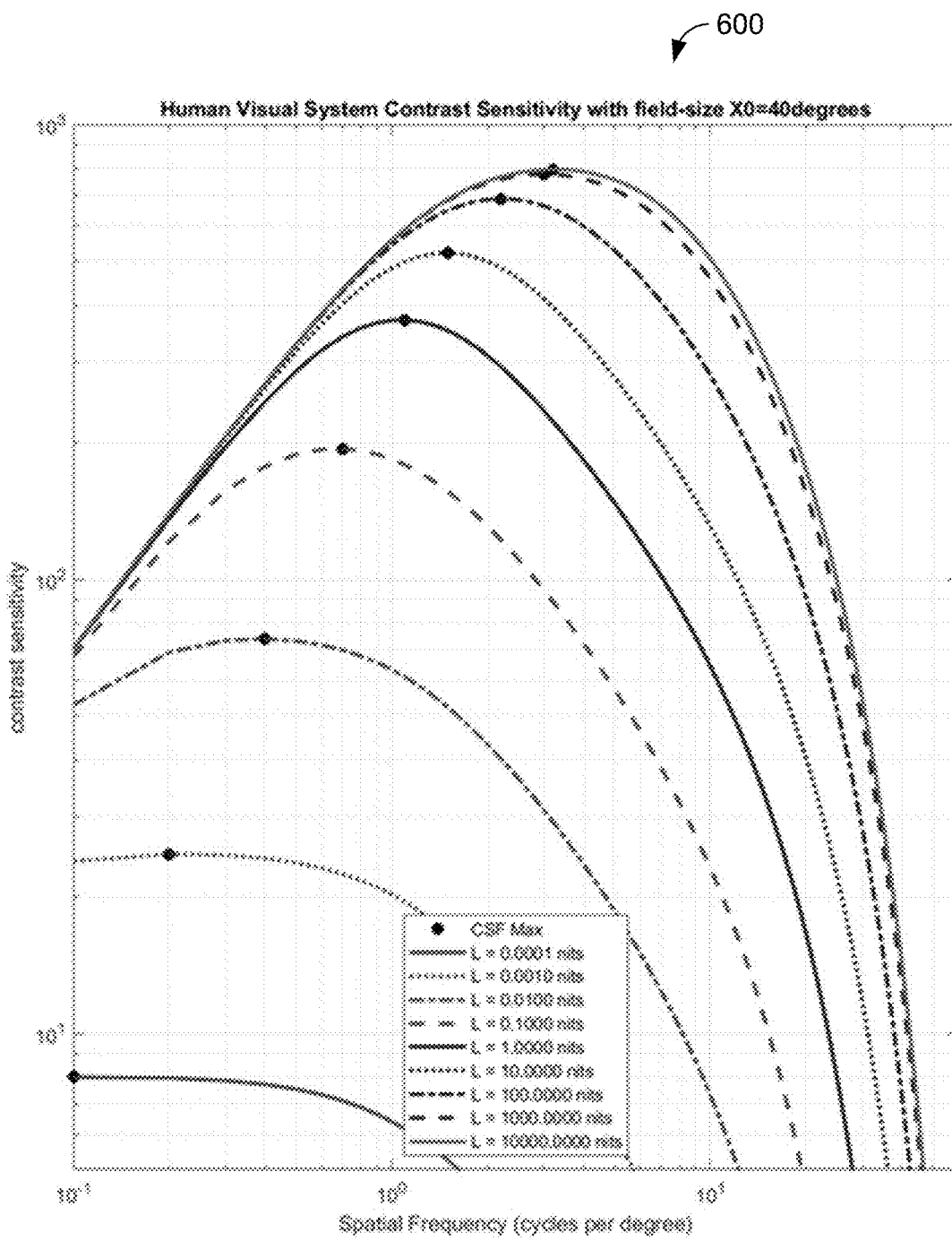
FIG. 6 is a chart comparing human contrast sensitivity to spatial frequency.

The Barten CSF model predicts the contrast sensitivity of human vision, and is dependent on 2 key factors, luminance and frequency. Without relying on any particular theory, the contrast sensitivity can be given by the inverse of the modulation detection threshold. There are various other factors that parameterize the Barten CSF model; for the analysis in this disclosure, the equation and parameters that were used in Miller et al. (Scott Miller, Mandi Nezamabadi and Scott Daly, "Perceptual Signal Coding for More Efficient Usage of Bit Codes", SMPTE Mot. Imag. J 2013, 122:52-59) for the Barten CSF model are used. The most common plotted presentation of the CSF is sensitivity versus spatial frequency, illustrating that high frequencies are less sensitive than low/mid spatial frequencies. This type of CSF graph is shown below for different luminance values, as shown in graph 600 of FIG. 6. Peak sensitivity (CSF Max in Graph 600) occurs at different frequencies depending on luminance. As noted from graph 600, the peak sensitivity is at low frequency when the illumination is low and at mid frequency for medium to high luminance.

Figure 7:
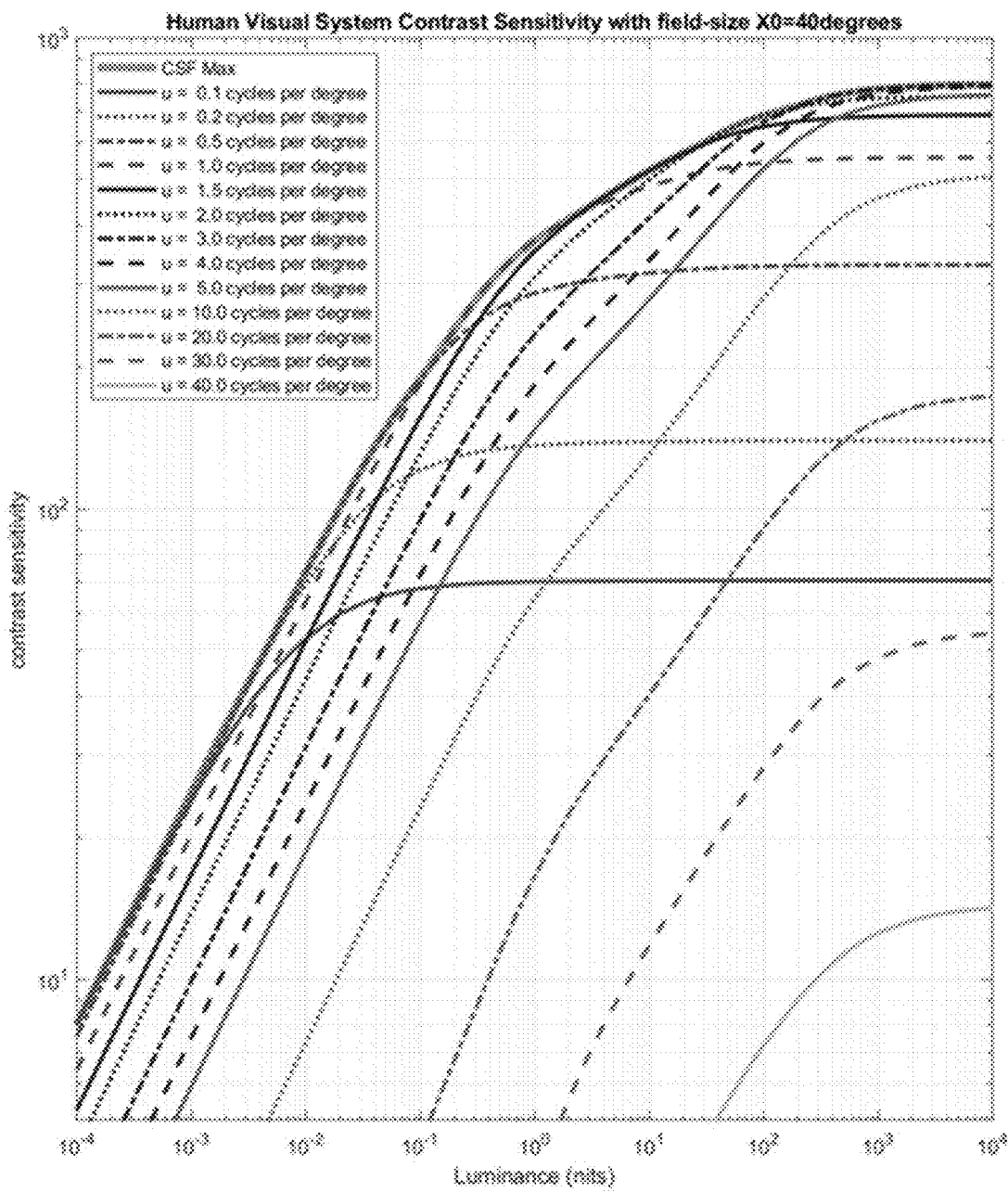
FIG. 7 is a chart comparing human contrast sensitivity to luminance.

Varying luminance and spatial frequency illustrate that peak sensitivity at a given luminance is also dependent on the spatial frequency, with lower frequencies (0.1-1 cycles per degree) dominating the sensitivity at luminance less than 1 nit and middle frequencies (1-5 cycles per degree) dominating the sensitivity at luminance above 1 nit. High frequencies (above 5 cycles per degree) are less sensitive. These relationships are also illustrated in the graph 700 shown in FIG. 7 of the CSF, using alternative graph axes of sensitivity versus luminance at different frequencies.

The CSF Max line in the graph 700 represents the maximum contrast sensitivity at each luminance across all spatial frequencies. The inverse of the CSF Max sensitivity represents a modulation of at most 1 JND across all frequencies at the specified luminance. Using the CSF Max value is the most conservative estimate of a JND since it is not dependent on the frequency content, and for this reason, the CSF Max value was used for the design of the Perceptual Quantizer (PQ) EOTF (Miller, et al.).

Figure 8A:
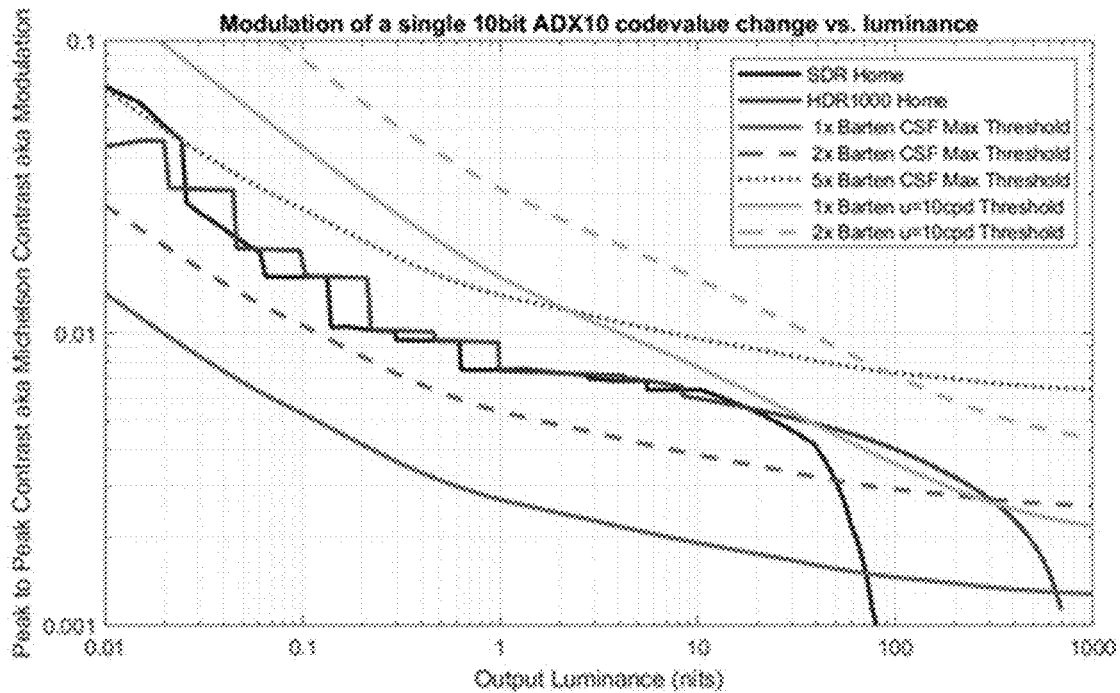
FIG. 8A is a chart comparing Michelson contrast to output luminance.

Referring to graph 800 of FIG. 8A, the modulation of 1 ADX10 codevalue for the various output targets is compared to the 1 JND modulation threshold derived from CSF Max with Field Size X0=40 degree and with a 10 cycles per degree stimulus. Multiples of the modulation threshold are also plotted. For high frequencies (10 cycles per degree and higher), SDR Modulation will not be visible at any luminance. HDR Modulation may be visible in medium luminance range (e.g., 35 nits to 300 nits). For lower frequencies (CSFMax), SDR Modulation will not be visible above 70 nits, while HDR Modulation may be visible across the full luminance range (0.01 to 1000 nits).

Figure 8B:
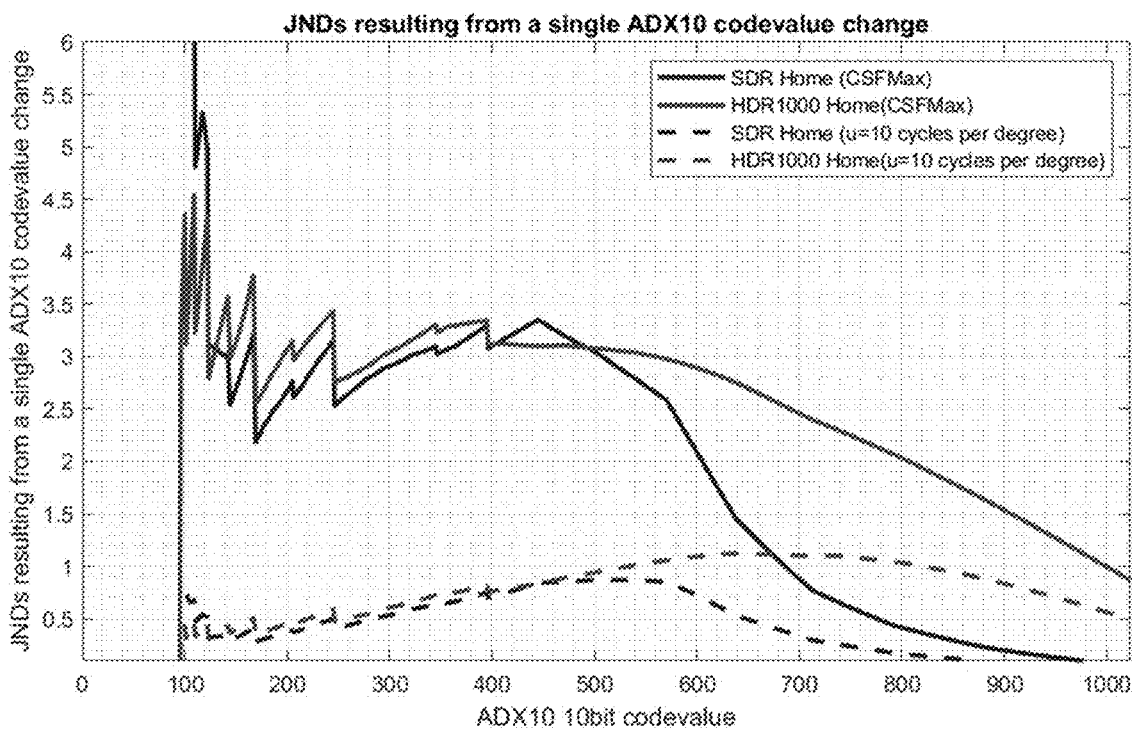
FIG. 8B is a chart comparing single-value JND's across ADX10 codevalues.

Graph 850 of FIG. 8B shows visibility of changes in the source image data for SDR and HDR outputs across all ADX 10 bit codevalues. For high frequencies (10 cycles per degree and higher), SDR Modulation will not be visible with any 10 bit codevalue. HDR Modulation may be visible with 10 bit codevalue range 540-820. For lower frequencies (CSFMax), SDR Modulation will not be visible with any codevalue above 685, while HDR Modulation may be visible with any 10 bit codevalue.

Figure 9:
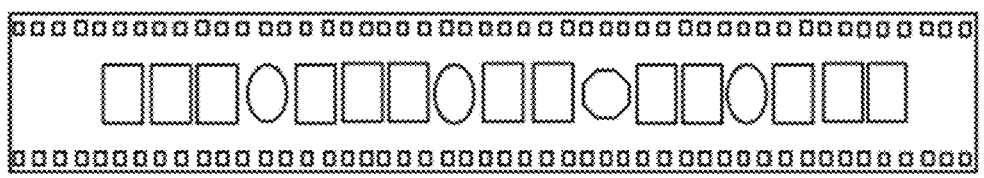
FIG. 9 is a diagram showing conceptual design of a Kodak Vision3 color negative control strip with different density patches.

The test materials used for the analysis in this disclosure were based on the KODAK VISION3 Color Negative Control Strips 100-foot camera negative film that is available for purchase from Kodak. When developed, this film has 17 patches of different densities, varying from high to low. FIG. 9 shows the conceptual design of the Kodak Vision3 Color Negative Control Strip 900.

A regular or "dry" IP was created from the developed negative. A wet gate Interpositive ("wet IP") was also created by immersing the negative and raw stock in a liquid while printing. The liquid has a similar index of refraction as the negative film base, which leads to reduced light scattering due to surface defects (like dirt and scratches) on the developed negative. The films were scanned 49 times using a modern film scanner.

Figure 10:
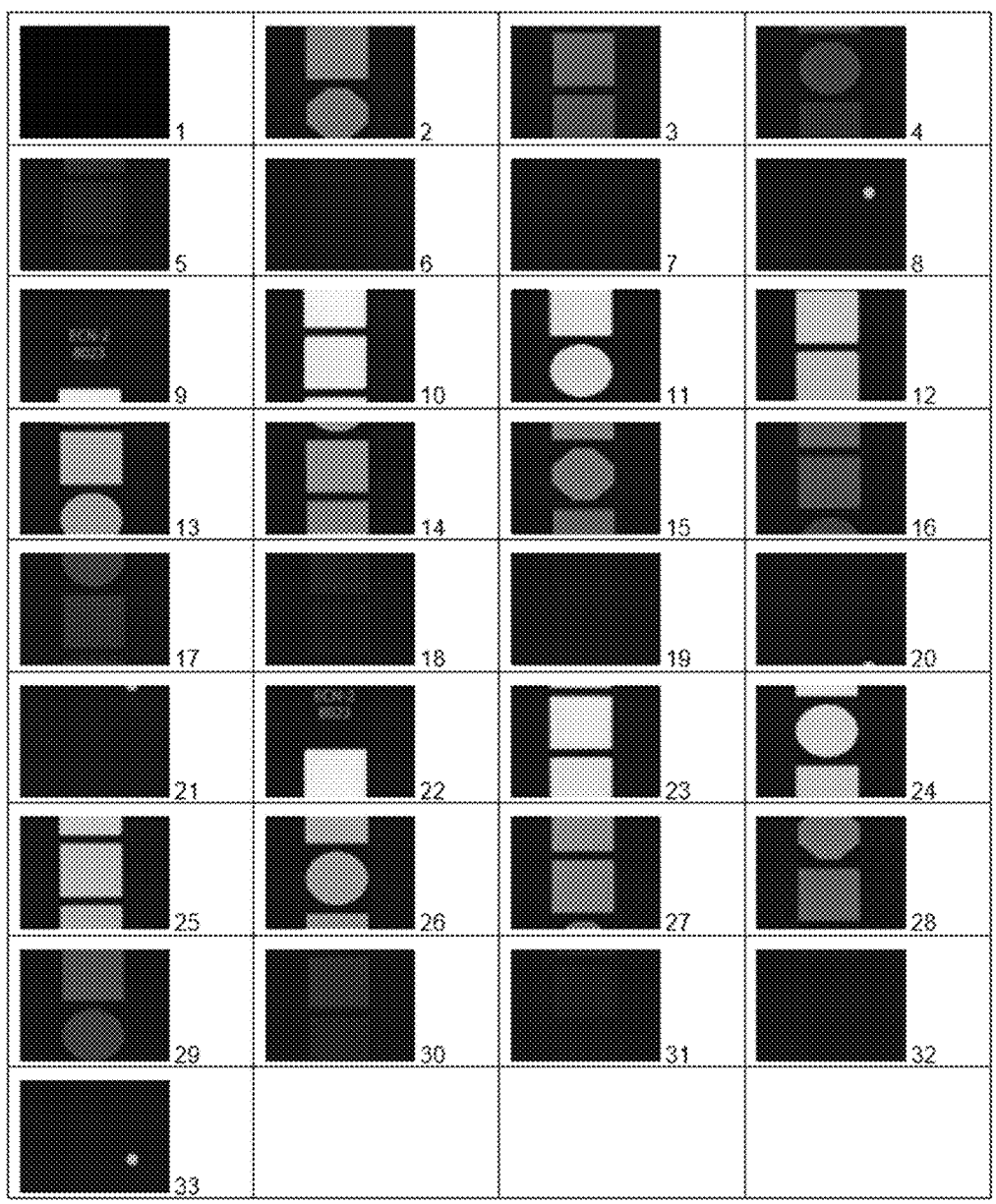
FIG. 10 is a table showing distribution of different densities over a 33-frame sequence.

Before performing the scan data analysis, a few steps were performed to get the data into a more useful form. The 1st step was to consolidate the scanned frames into an approximation of the 17-patch strip. The 2nd step was extracting regions of interest corresponding to each single density patch. The 3rd step was identifying patches that were contiguous across a single scanned 4-perf frame. The scans were Full-Aperture (4-perf) but the density patches in the negative and IPs were not aligned to the film perforations/normal frame boundaries. The 17 steps were spread across the equivalent of 12 or 13 4-perf frames, as represented by thumbnails of scanned frames 1-33 shown in FIG. 10.

Because there is not a regular cadence between the 4-perf film frames and the density patches, the small "cigarette burn" aka "cue dot" or "change over dot", shown in frames 8, 20/21 and 33 in the thumbnails above indicates the 17-density strip is repeating and falls on 12 to 13 frame intervals and at different vertical heights within the frame. There were 1593 4-perf frame scans for each 100-foot roll of film. The vertical position of the very end of the "cue dot" was determined for the whole sequence of 1593 frames, which resulted in 124 cue dot locations.

Figure 11A:
FIG. 11A shows a vertical stack created of scanned frame lines across 12 or 13 frames between cue-dot locations.

A vertical stack was created of the scanned frame lines (across the 12 or 13 frames) between the cue-dot locations, as shown in the examples shown in FIG. 11A. Since the number of frames varied between 12 and 13, the total height of the vertical stack was kept fixed at 13×1556=20228. The vertical stack pixel dimensions were 2048×20228. If there were less than 20228 lines of data between the determined "cue dot" locations, the remaining lines were filled with 0 to keep the patches approximately aligned from stack to stack.

The next process was directed to extracting regions of interest for each density patch. After the strips were assembled, the patches of different densities were cropped to 17 different individual files per strip as shown in the thumbnails illustrated by FIG. 11B. It was then necessary to identify and stabilize contiguous patches.

Due the frame/patch misalignment, only 810 frames of the 1593 4-perf frames per 100-foot roll contained whole contiguous patches. Each contiguous whole frame patch occurred between 45-51 times per 100-foot roll. For example, there were 51 contiguous whole patches of patch-2, while there were only 45 contiguous whole patches for patch-14. To simplify the subsequent data analysis, for each of the 17 patches of different density, only the first 45 contiguous whole patches were used for the analysis.

For stabilizing contiguous patches, the contiguous patches in the set were spatially registered with reference to the first scan of the first strip of each patch by performing a horizontal and vertical translation search and performing a corresponding translation-compensation. Integer-pixel translation compensation may be used to avoid generating new sample values that were not directly produced from an actual scan. Fractional-pixel translation-compensation may provide a more accurate registration result.

Alignment is an important aspect when averaging to remove noise. In some scanners there may be a spatial variation across the scanner's sensor array. For example, there may be one or more dead pixels in the scanner sensor. This could generate a temporal artifact due to different sensor photosites sampling the same location on the film during different scans. In such implementations, the scanner's spatial variation can be characterized and compensated for as part of the alignment process. Consider a scanner having a sensor array with non-uniform sensitivity or a scanner having a light source with non-uniform exposure across the frame. For example, the peak sensitivity could be 1.0 in the middle of the frame and the peak sensitivity at the edges of the frame can be 0.5. In such implementations, the edges of the frame could be boosted 2 times as compared to the middle of the frame, and then the alignment process could be run. A 2 times gain could increase the noise on the edges of the frame. In practice, the light source could cause a fairly smooth and slowly changing non uniformity, while the sensor could have a more varied non uniformity. Analysis of test film scans is presented below. Each 100-foot reel of film was scanned 49 times, using a modern double-flash scanner outputting 2K scans. Analysis of multiple scans of the same physical piece of film facilitates film scanner noise characterization. Analysis of multiple patches of the same density on different pieces of film facilitates film grain noise characterization. To characterize the scanner and film grain noise, a technique like the analysis of temporal noise in Burns and Williams (Peter D. Burns and Don Williams, "Identification of Image Noise Sources in Digital Scanner Evaluation", Proc. SPIE-IS&T Electronic Imaging Symposium, SPIE vol. 5294, pg. 114-123, 2004) may be used.

After isolating the 45 contiguous patches from the various strips containing the same film density, the data set for further analysis was reduced to 45 strips of film, with each strip of film containing 17 patches of low to high density. The test process used 49 scans of those 45 strips, which created 49 scans of the same 45 density patches for each of the 17 different densities. There were 3 types of film used: the camera negative, a dry IP struck from the camera negative and a wet IP struck from the camera negative. The negative was on Kodak Vision3 5213 camera negative film stock while the IPs used Kodak Vision3 Intermediate film stock.

To simplify the description of the analysis and results, the following terms will be used. "Strip" means a different section of the film, for example the strips containing 17 patches for different density. A "scan" means a scan of a film strip. "Film type" refers to a different type of film corresponding to either camera negative, dry IP or wet IP. "Patch" refers an area on the film of a certain density The patches in each scan were spatially registered to the first scan of the patch. The median across the 49 scans of that patch was calculated, which eliminates the scanner noise leaving only film grain noise. Scanner noise is assumed to be zero mean. Accordingly, taking the median of 49 scans of the same piece of film can eliminate the scanner noise leaving just film grain noise. Each patch in the set of 45 strips were spatially registered to the corresponding patch in the first strip. The median of each corresponding patch in the set of 45 strips was calculated, which eliminates the film grain noise and should leave only the average density free of noise. The pseudocode in the following paragraph illustrates a method for calculation of the median.

```
for strips s = 1 to 49 {
    for patch p = 1 to 17 {
        For each pixel in the patch p {
            calculate the median of the same pixel across the 49
            scans of the same piece of film (strip s patch p)
        }
    }
}
```

Film grain noise and scanner noise is assumed to be zero mean, and therefore taking the median of 49 scans of the 45 strips of film eliminates the film grain noise and scanner noise leaving just the noise-free image of the scene (aka background image). This noise-free image can be used to further isolate the film grain noise and scanner noise. After eliminating the scanner and film grain noise using the median operator as described, some additional noise and image structure may still be present that can be attributed most likely to the material used to create the camera negative that turned into the process control strip. This background image can be subtracted from the samples, creating a fairly clean sample of the noises of interest.

Any useful area, for example a 128×128 pixel area of the resulting images, may be used for the noise analysis. Some of the scans and strips may have dirt and scratches in different parts of the patch. Different 128×128 pixel areas may be selected in each of the 17 patches to avoid these surface defects in the negative scans, and the same areas of the patches may be used for the dry IP and wet IP scans to keep the grain samples aligned as much as possible across the data set.

A process control strip may be used to generate test materials for this study because it was already exposed and was therefore simple to use for testing, as it was already part of Kodak's product catalog. An alternative approach would be to use a sensitometer to expose a test film to a fixed amount of light exposure. The additional noise that was present due to the use of the process control strips was treated like fixed-pattern noise and removed from the test materials via subtraction.

Figure 12:
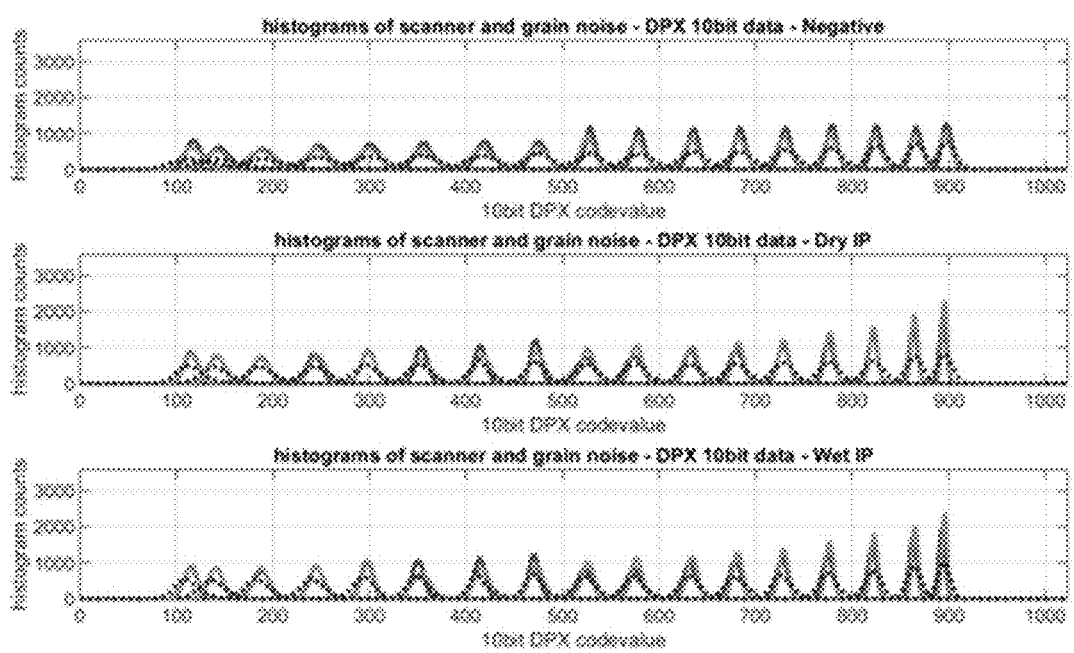

Each of the plots 1200 shown in FIG. 12 represent a histogram of a 128×128 pixel area of a single scan of each of the 45 different strips and same patch, illustrating the variance of the patches' pixel values due the combination of film grain and scanner noise; the red, green and blue lines in the plots 1200 correspond to the red, green and blue color channels of the film scan data.

Figure 13:
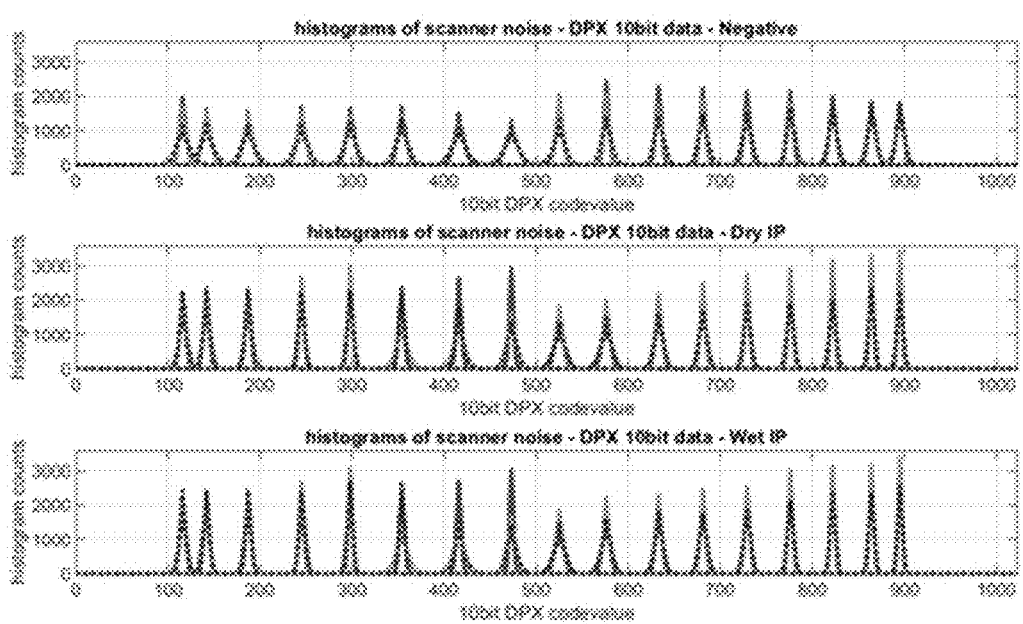

Each of the plots 1300 shown in FIG. 13 represent a histogram of a 128×128 pixel area of 49 scans a single strip and same patch, illustrating the variance of the patches' pixel values due to scanner noise; the red, green and blue lines in the plots correspond to the red, green and blue color channels of the film scan data.

Each of the plots 1400 shown in FIG. 14 represent a histogram of a 128×128 pixel area of the median of 49 scans of the same strip and same patch, illustrating the variance of the patches' pixel values due to film grain noise (assuming that the median operating over 49 scans eliminated the scanner noise); the red, green and blue lines in the plots correspond to the red, green and blue color channels of the film scan data.

The histogram results shown above illustrate that the variance due to film grain increases for the dark patches and is larger in the blue channel compared to the red and green channels. The film grain's variance is larger in negative than the IPs. The grain's variance is slightly larger in the Dry IP compared to the Wet IP.

The table shown in FIG. 15 describes the relationship between patch number, ADX10 10 bit codevalue and HDR/SDR output luminance.

Eliminating Scanner Noise

Scanner noise can be eliminated by post-processing of multiple film scans as follows: (1) stabilize multiple scans of the same frame of film; (2) compute median (or other statistical measure) of each pixel in the stabilized scans of each frame of film; and (3) setting the true value of the pixel equal to an appropriate statistical aggregate, for example an average or median.

The question of how many multiple films scans of the same frame of film are needed to eliminate scanner noise with the median operator is dependent on the strength of the scanner noise and the visibility of the scanner noise in the output formats. Generally, the number of scans necessary should be whatever is needed to reduce the scanner noise to just below the threshold of visibility. Using more scans than are needed to eliminate the scanner noise has the drawback of taking more time to complete the scanning process as well as potentially damaging the film due to wear and tear, additional handling and introduction of dirt and scratches. Other details and variations may be as described elsewhere herein.

Visibility of Noise in Film Scans

This section describes a method for analyzing the visibility of noise. To use the Barten CSF model to predict visibility of a stimulus, the frequency content of the stimulus is analyzed and its average frequency and magnitude determined. A Fast Fourier Transform (FFT) may be used to convert a selected pixel area (e.g., 128×128) of the samples of scanner noise, grain noise and scanner plus grain noise to the frequency domain. The luminance of the SDR and HDR outputs may be analyzed with the FFT, which returns a magnitude in luminance (nits) across a normalized frequency range from [0,1]. To convert the normalized frequency to spatial frequency, it may be assumed that an 1920×1080 HD extraction from the 2048×1556 2K scan is viewed at 3 screen heights, which leads to the highest frequency representable in the source material (corresponding to normalized frequency=1.0) to correspond to approximately 30 cycles per degree in spatial frequency units. The average frequency of the resulting noise spectrum may be computed as the spectral centroid and the average magnitude may be the simple mean of the frequency domain magnitude values.

Figure 16:
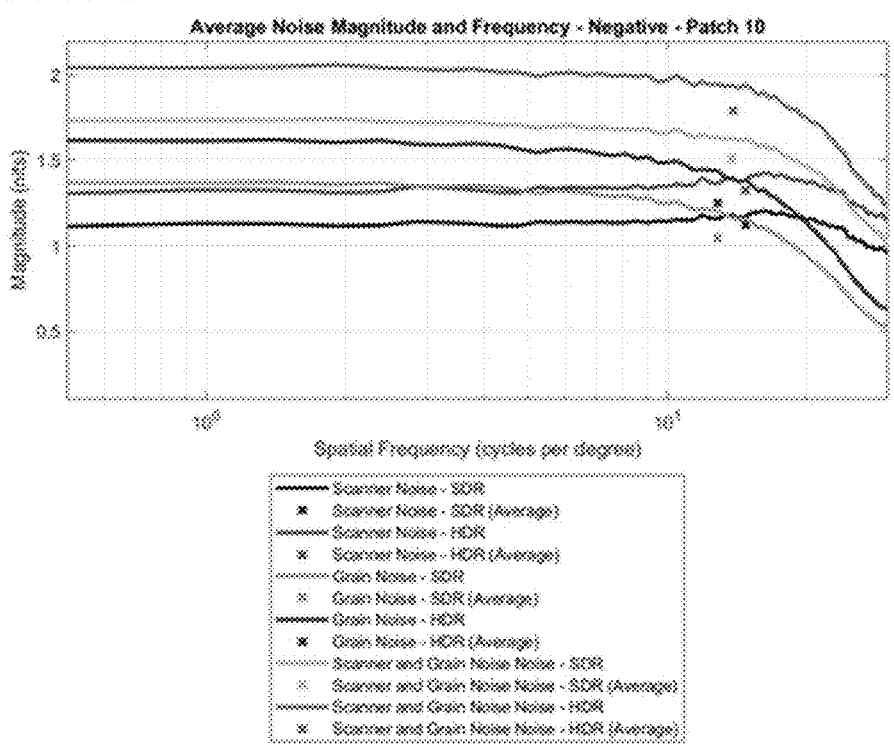
FIGS. 16-18 are charts comparing average noise frequency and magnitude for various examples.
Figure 17:
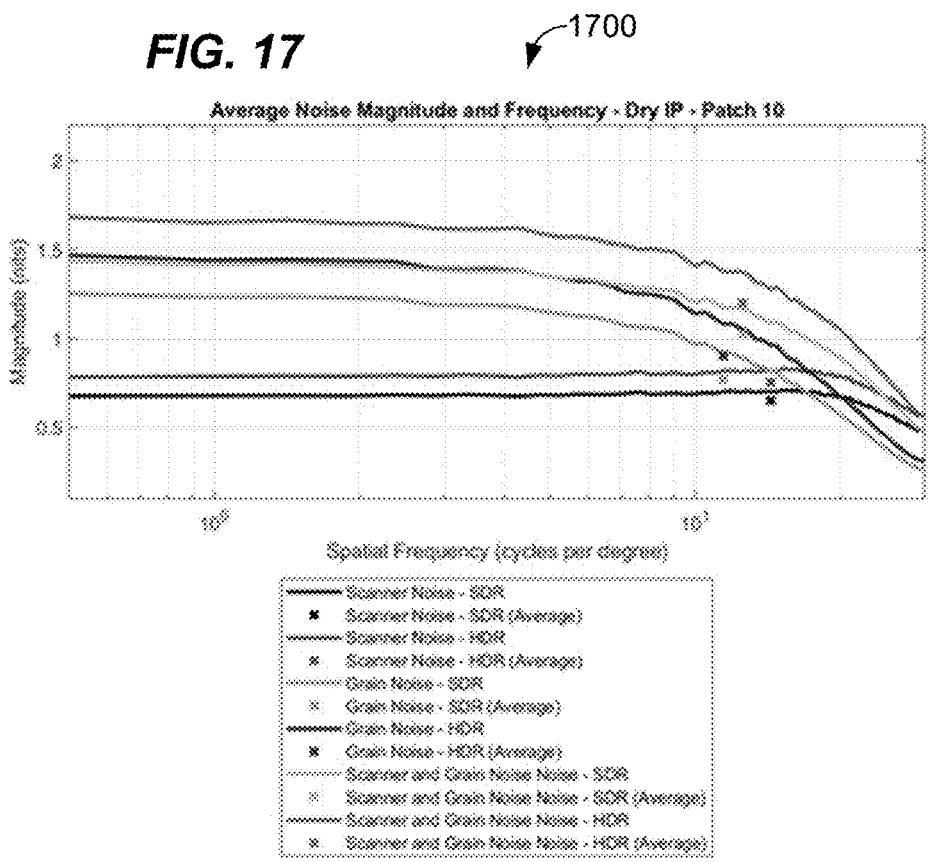
Figure 18:
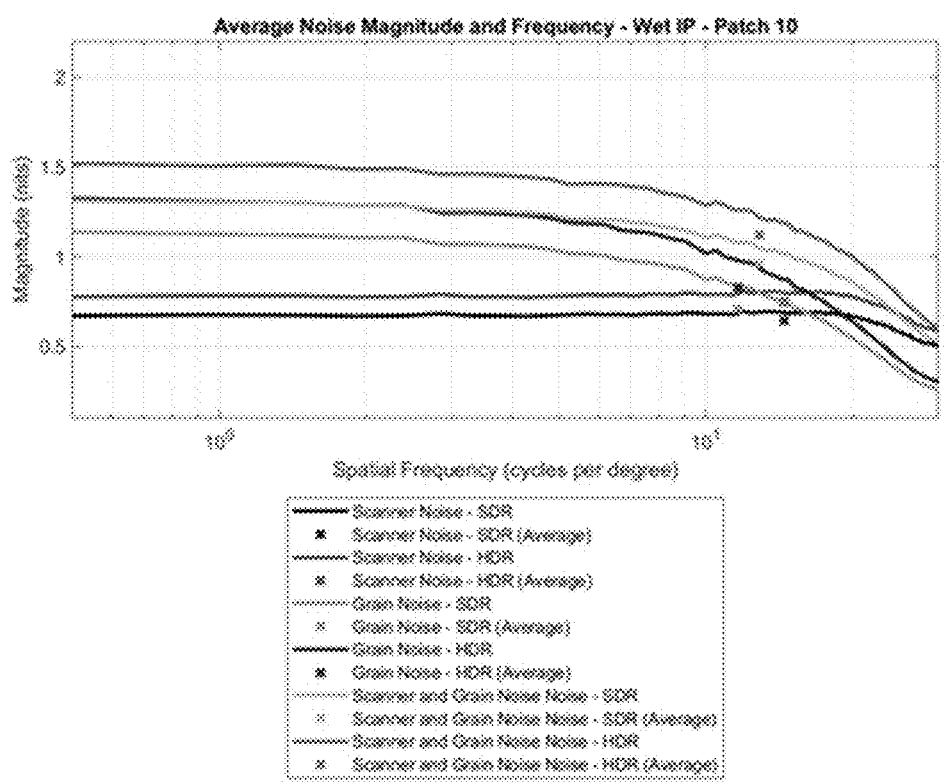

The detailed results of these frequency domain calculations for one of the patches (Patch 10) are shown in the FIGS. 16, 17, and 18 corresponding to the different film types (negative, dry IP and wet IP).

Figure 19:
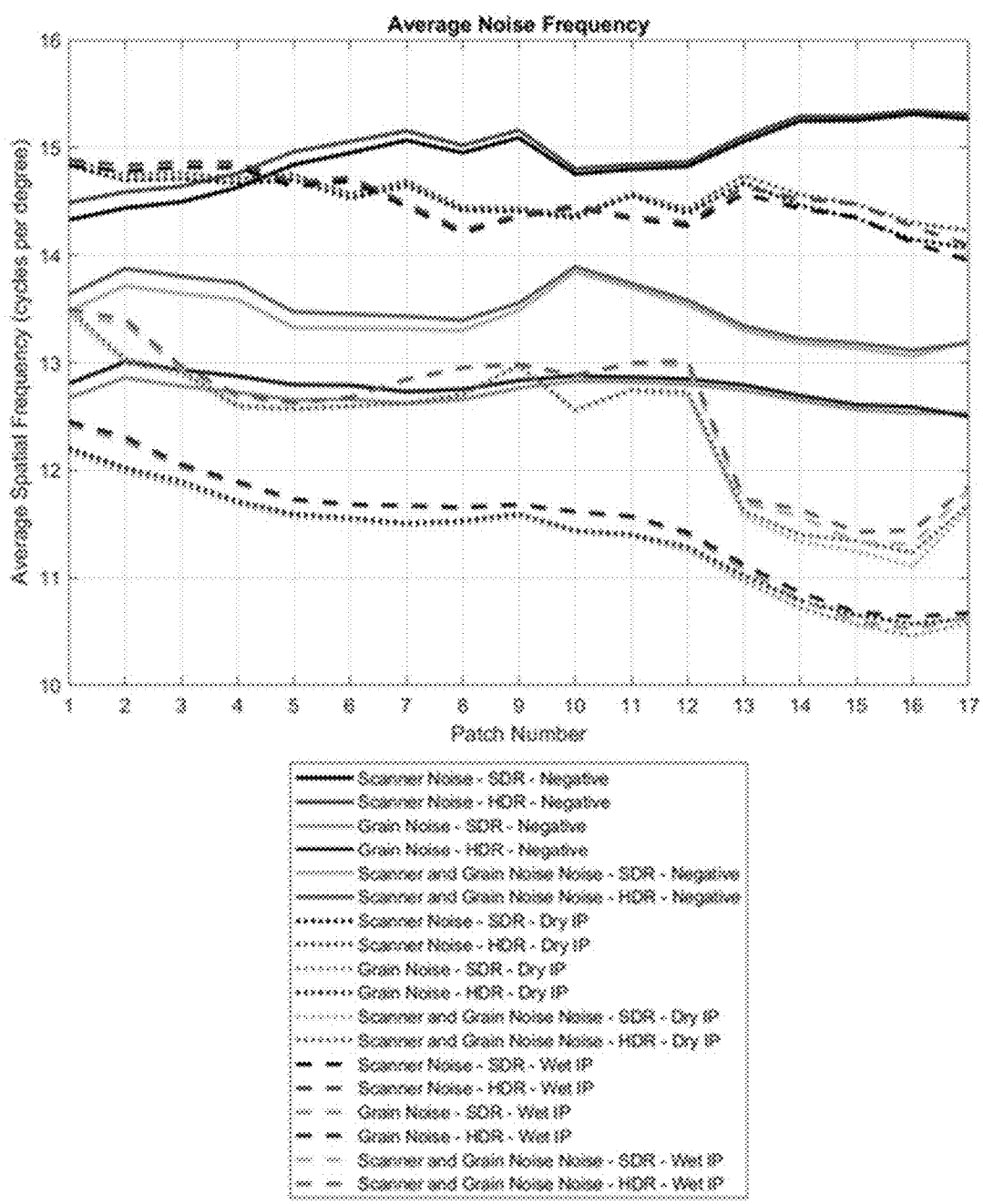
FIG. 19 is a chart comparing average spatial frequency to average noise frequency for various examples.

The noises' average frequency across all the patches are shown in the graph shown in FIG. 19. It is observed from FIG. 19 that grain noise average frequency is lower for dark patches than bright patches (larger grains are developed at low exposure) while scanner noise average frequency is higher than grain noise average frequency. However, this is reversed for black and white films because black and white films comprise silver particles having different physical characteristics as compared to dye particles of color film.

Figure 20:
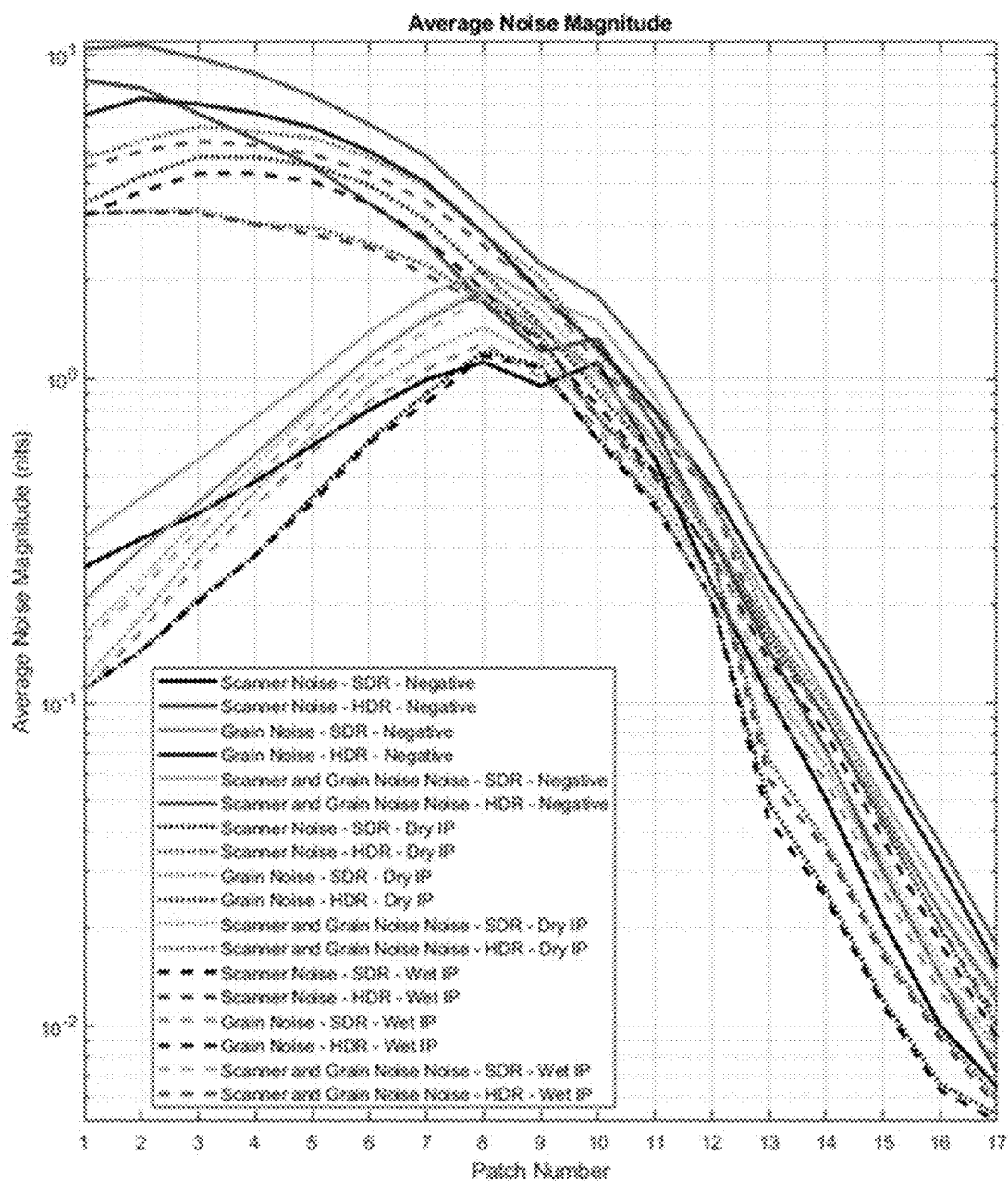
FIG. 20 is a chart comparing average noise magnitude across different patches.

The noises' average magnitude across all the patches are shown in the graph shown in FIG. 20. It is observed from FIG. 20 that grain noise average magnitude is significantly higher in bright patches in HDR compared to SDR while scanner noise average magnitude is significantly higher in bright patches in HDR compared to SDR.

Using the average luminance (Lavg) of each patch (listed in FIG. 15) and the average frequency of the noise in each patch, the Barten CSF model is queried for the corresponding Modulation Threshold (MT). One JND's worth of luminance change is computed as Lmax−Lmin, with Lmin=Lavg and Lmax=Lmin*((1+MT)/(1−MT)). The number of JNDs of noise is then computed as the 2 times the average noise magnitude divided by the corresponding one JND of luminance change. This ratio is the number of JNDs that are estimated for the noise visibility. If the number of JNDs is less than 1, the noise is expected to be not visible. While JNDs greater than 1 indicate correspondingly more and more noise visibility.

Figure 21:
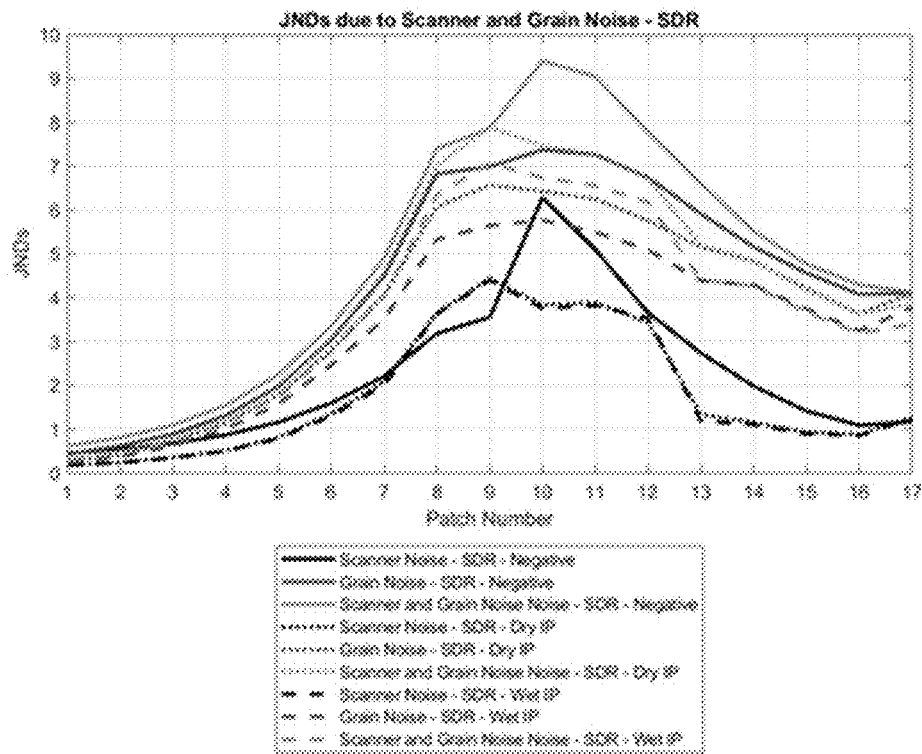
FIGS. 21-22 are charts comparing JNDs due to scanner and grain noise across different patches.
Figure 22:
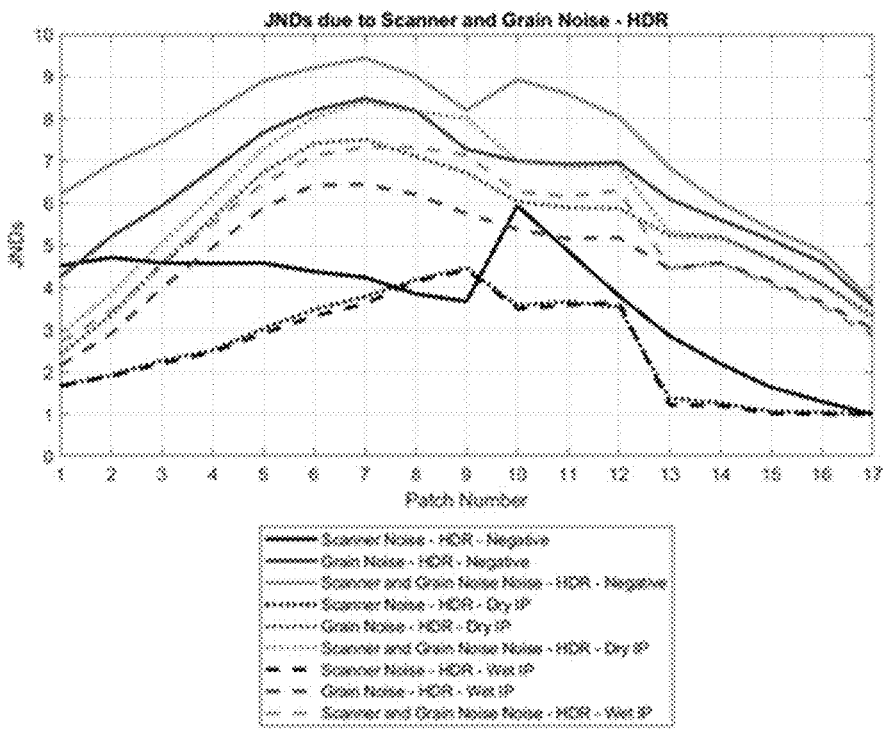

FIGS. 21 and 22 show the calculated JNDs for the noises for the SDR and HDR output targets.

As expected, the visibility of noise (JNDs) is higher in the HDR output compared to the SDR output. For the brightest patches in the HDR output, scanner noise is about 2 JNDs more visible in the Negative compared to the IPs. Across all the patches in the HDR output, grain noise is about 2 JNDs more visible in the Negative compared to the Wet IP and about 1 JND more visible in the Negative compared to the Dry IP. In both the SDR and HDR outputs the Scanner noise has a large relative increase in visibility of about 1 to 2 JND for patches 10 and 11, perhaps this is due to poor signal to noise ratio in the double-flash scan exposure overlap region.

It is expected that different scanners and different scan settings could have different scanner noise characteristics and visibility.

The calculated JNDs of noise reduction due to removal of scanner noise is shown in FIG. 23. Examples of the isolated noise types are shown below for patch 10 in SDR for the 3 different film types are shown in FIG. 24, zoomed to increase visibility.

Sinusoids gratings and patches are usually evaluated with the Barten CSF model; the use of Barten CSF with noise stimulus as presented here is not common as it seems the visibility of noise is not a frequent topic in vision science references. In contrast, the Barten CSF model accommodates a stimulus's spatial frequency and luminance. Ability to model the response at different luminance is at least helpful, and may be critical, to elimination of scanner noise in HDR Video.

An analysis of film scanner and film grain noise is discussed above. The tests described above examined the impact of film scanner and film grain noise on visibility for SDR and HDR output formats. Scanner noise was eliminated by taking the median across each pixel in multiple scans of the same piece of film. Scanner noise had a significant affect in all 17 patches for HDR targets and eliminating scanner noise in the HDR targets resulted in approximately 1-2 JNDs worth of noise reduction. Scanner noise had a lesser effect on SDR targets, for example the brightest patches had no visible scanner noise in SDR targets, but for the several patches in which scanner noise was visible in SDR targets, its elimination resulted in approximately 0.5 to 2 JNDs worth of noise reduction. Scanning an IP instead of the Negative is an alternative way to reduce scanner noise in the HDR outputs. Furthermore, scanning the IP compared to the Negative also reduces the grain noise by 0.5 JND and 1.0 JND for dry IP and wet IP compared to the Negative in HDR outputs. It was observed that the grain noise for Dry IP and Wet IP was lower compared to the Negative. It was further observed that scanner noise was lower for IPs as compared to the Negative. Accordingly, the methods described herein can be used to select an appropriate film type to create a master depending on the scanner noise characteristics. For example, if the scanner noise is greater than a threshold amount, then it is preferable to use a dry/wet IP to create a master instead of a Negative. Furthermore, a Negative can produce sharpened pixels that may cause additional noise in the projected image. Thus, it may not be desirable to use a Negative as a source for projection or as source for remastering.

Other Aspects of Eliminating Scanner Noise in Film Production

Film scanning is used in both modern film production and remastering workflows to convert the analog medium of film to a digital format. The film scanning process itself can introduce scanner noise into the digital image which has different characteristics than the more familiar film grain noise. Film grain noise is inherent in the physical film medium itself and its visibility and characteristics vary based on the film format and the type of film used. Filmmakers often consider the characteristics of film grain as a visual aesthetic that can be leveraged creatively to enhance the storytelling. Scanning different types of film elements (e.g. negatives and IPs) in different film scanners with different scan settings can lead to different results. The visibility of these differences change when the scan is used to create an SDR Home Master or SDR Cinema release versus an HDR Home Master due to the increased luminance and contrast often associated with the HDR format. Systems and methods of reducing scanner noise in the digital images obtained by scanning films are described herein.

Strength of scanner noise imparted by a scanner can be characterized by a standard deviation 'σ'. When a frame of film is scanned by a scanner having scanner noise with a strength 'σ', the distribution of the scanner noise can vary spatially and temporally for different scans of the same frame of film. The scanner noise can be reduced or eliminated by processing the multiple film scans.

Figure 25:
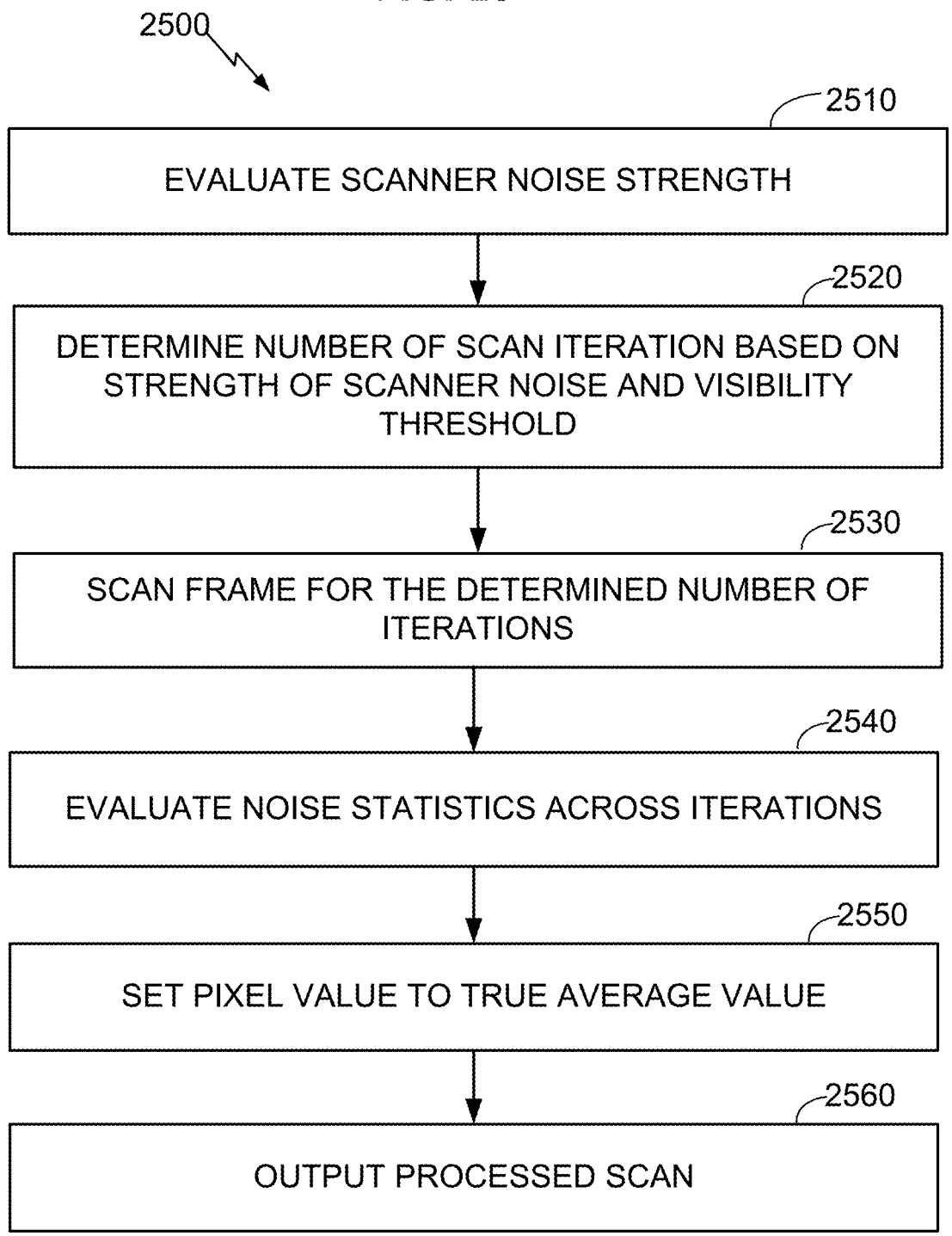
FIG. 25 is a flow chart illustrating aspects of a method for reducing scanner noise from a scanned image.

FIG. 25 is a flowchart illustrating aspects of a method 2500 of reducing/eliminating scanner noise. Various implementations of a programmable scanner (film scanning apparatus) can be configured to implement the method 2500 of reducing/eliminating scanner noise in the digital image by obtaining multiple scans of the same frame of the film. The multiple scans can be obtained by mechanically moving the film strip through the scanner multiple times. However, mechanically moving the film strip through the scanner multiple times can damage the film strip. Accordingly, in various implementations, the scanner can be configured to obtain multiple optical images of the film strip to be archived instead of mechanically moving the film strip across the scanner.

Evaluating scanner noise strength 2510 may include stabilizing the multiple scans by spatially registering the subsequent scans of the multiple scans with reference to the first scan of the multiple scans. At 2520, a processor may determine for a given film set (e.g., a frame or sequence of frames) an initial number of scan iterations based on the strength of scanner noise and the applicable visibility threshold, as disclosed herein above. At 2530, the processor may scan the each frame for the determined number of iterations. At 2540, the processor obtains a statistic (e.g., median or average) of the noise of the same pixel across the multiple scans. At 2550, the processor determines true values of individual pixels of the digital image data based on the noise statistic for each of the individual pixels and generates scanner noise reduced digital image data for the frame, wherein pixels are assigned their respective ones of the true values. This process can be performed for all pixels in the frame. The number of multiple scans of the same frame of film can depend on the strength of the scanner noise. For example, the number of multiple scans can be whatever reduces the visibility of the scanner to be less than the threshold of visibility. The threshold visibility can be determined using just noticeable difference (JND).

The scanner can be configured to determine 2520 the number of scans to obtain using an iterative process. For example, the scanner may be configured to obtain a first number of scans, calculate a statistic of the noise of the same pixel across the first number of scans, subtract the statistic from the corresponding pixel of the first scan; determine if the scanner noise is below a threshold visibility; and obtain a second number of scans if the scanner noise is not below a threshold visibility. See FIG. 26.

Without relying on any particular theory, the visibility of scanner noise can depend on the type of the film and/or the type of the scanner. For example, scanner noise can be imperceptible in films having a grain noise below a threshold gain noise. Accordingly, the method of obtaining multiple scans may be performed if the grain noise is above a grain noise threshold. In some other implementations, only certain areas of the film (e.g., bright/dark areas) are scanned multiple times instead of scanning the entire film.

Figure 26:
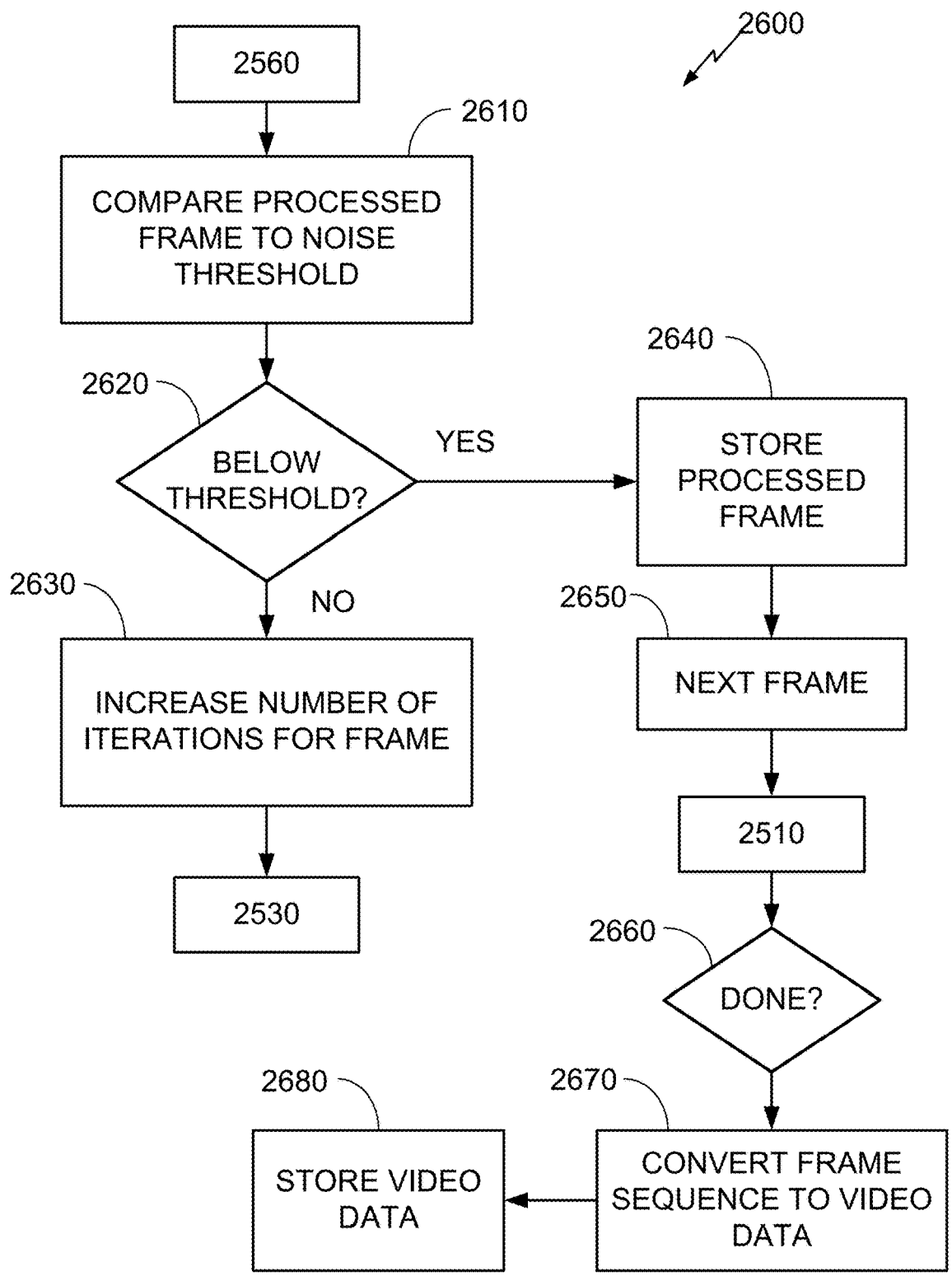
FIG. 26 is a flow chart illustrating aspects of a method for preparing digital video with reduced scanner noise from scanned input.

FIG. 26 shows further operations 2600 for converting a sequence of images (e.g., film frames) into video data and adjusting a number of scanning iterations. A processed image from block 2560 is tested at block 2610, by comparing to a noise threshold for scanner noise with a detected noise level for the image. If at 2620 the noise is below the threshold of visibility, at 2640 the processor may store the frame with an indication (e.g., by assigning a storage address) that the image is satisfactory for video processing. The threshold of visibility may be determined using a calculation of JND as described under "visibility of noise in film scans" herein above; see also FIG. 28. At 2650, the process 2600 picks the next frame and reverts to block 2510 of method 2500.

At 2630, if the noise is above the threshold of visibility, the processor may increase the number of iterations and resubmit the frame for processing by method 2500 at block 2530. The processor may increase the number of iterations by a predetermined constant amount, or by an amount that is some function of the calculated noise visibility, for example, a difference between the measured visibility and the threshold of visibility, multiplied by some factor of proportionality.

At 2660, if no more frame are in queue for processing, at 2670, the processor converts the frame sequence stored in memory to a video format using any suitable algorithm. At 2680, the processor stores the resulting video file or files.

In accordance with the foregoing, and by way of additional example, FIG. 27 shows more general aspects of a method or methods 2700 according to one embodiment, as may be performed by a programmable scanner as described herein. It should be appreciated that the more general operations of method 2700 may include or embody more detailed aspects of corresponding methods described herein above.

Referring to FIG. 27, a computer-implemented method 2700 for preparing digital image data from an analog image input may include, at 2710, scanning, by an analog-to-digital image scanner, an analog image for multiple iterations, resulting in digital image data for each of the iterations. In an aspect, the method may include determining a number of the multiple iterations for the scanning, based on a visibility metric (see FIG. 28).

The method 2700 may further include, at 2720, calculating, by at least one processor of the scanner, a noise statistic for individual pixels of digital image data across the iterations. Calculating the noise statistic may include calculating at least one of a median average, or other statistical measures, as described herein.

The method 2700 may further include, at 2730, determining, by the at least one processor, true values of individual pixels of the digital image data based on the noise statistic for each of the individual pixels and generating scanner noise reduced digital image data wherein pixels are assigned their respective ones of the true values. The method 2700 may further include, at 2740, saving the scanner noise reduced digital image data in a computer memory. The method 2700 may include repeating the operations 2700 for a sequence of frames resulting in a sequence of scanner noise reduced digital images in the memory indicated as satisfactory for use, converting the scanner noise reduced digital images to a digital video file, and storing the digital video file in a computer memory.

With reference to FIG. 27, the method 2700 may include determining, by the at least one processor whether scanner noise in the scanner noise reduced digital image is below a specified threshold. The method 2700 may further include, only if the scanner noise in the scanner noise reduced digital image is not below the specified threshold, repeating operations 2710, 2720, 2730, and 2740 for the analog image using a greater number of iterations than previously used for the same analog image. The method 2700 may further include, only if the scanner noise in the scanner noise reduced digital image is not above the specified threshold, indicating the scanner noise reduced digital image in the computer memory is satisfactory for use.

In various implementations, test strips, such as, for example, the test strips described herein can be scanned multiple times (e.g., 5-100 times) to obtain scanner noise statistics. The scanner noise statistics associated with different test strips can be stored in a programmable memory of the scanner which can then be used to eliminate scanner noise from the scanned image of an actual film strip to be archived to reduce artifacts produced due to scanner noise in the manner discussed above. In this way, it is not required to scan the actual film strip multiple times.

Visibility of scanner noise is an important metric for optimizing efficiency of the methods for reducing scanner noise. If noise is not visible, than processing may be omitted. If noise is expected to be noticeable, then a measure of noticeability is useful for determining the amount of processing that may be required, for example, the number of scanning iterations to use in calculating a statistical measure of variation. The operations 2800 shown in FIG. 28 may be performed as part of the method 2500, or independently for other purposes.

The method of 2800 may include, by at least one processor at 2810, converting a selected pixel area of the digital image data for each of the iterations to the frequency domain and analyzing pixel luminance in the frequency domain, and determining minimum, maximum, and average luminance for the pixel area.

The method of 2800 may include, by at least one processor at 2820, calculating a Just Noticeable Difference (JND) measure for the pixel area based on the Barton modulation threshold, the minimum, maximum and average luminance values, and the average noise magnitude. Further details regarding computation of JND may be as described herein above under the heading "visibility of noise in film scans," and elsewhere herein.

The method of 2800 may include, by at least one processor at 2830, determining a number of multiple iterations for scanning the analog image as a function of the JND, for example using a difference and proportional adjustment.

The method 2700 may include any one or more additional operations as described above and below herein. Each of these additional operations is not necessarily performed in every embodiment of the method, and the presence of any one of the operations does not necessarily require that any other of these additional operations also be performed. For example, optionally, method 2700 may further include the operations 2800.

FIG. 29 is a conceptual block diagram illustrating components of an apparatus or system 29 for preparing digital image data from an analog image input as described herein, according to one embodiment. As depicted, the apparatus or system 29 may include functional blocks that can represent functions implemented by a processor, software, or combination thereof (e.g., firmware).

As illustrated in FIG. 29, the apparatus or system 2900 may comprise an electrical component 2902 for scanning an analog image for multiple iterations, resulting in digital image data for each of the iterations. The component 2902 may be, or may include, a means for said scanning. Said means may include the processor 2910 coupled to the memory 2916 and to any suitable mechanism for receiving film stock and scanning is using a light source and image sensor connected by an optical path in which the film stock can be interposed on a frame-by-frame basis. Such scanners are commercially available.

The apparatus or system 2900 may further comprise an electrical component 2904 for calculating a noise statistic for individual pixels of digital image data across the iterations. The component 2904 may be, or may include, a means for said calculating. Said means may include the processor 2910 coupled to the memory 2916, and to the input device 2914, the processor executing an algorithm based on program instructions stored in the memory. Such algorithm may include a sequence of more detailed operations, for example, calculating a measure of noise for each pixel in each iteration, and then computing a median or average for the measure of noise across the iterations, as further described herein above.

The apparatus or system 2900 may further comprise an electrical component 2904 for determining true values of individual pixels of the digital image data based on the noise statistic for each of the individual pixels and generating scanner noise reduced digital image data wherein pixels are assigned their respective ones of the true values. The component 2906 may be, or may include, a means for said determining. Said means may include the processor 2900 coupled to the memory 2916, and to the input device (optical scanner) 2914, the processor executing an algorithm based on program instructions stored in the memory. Such algorithm may include a sequence of more detailed operations, for example, selecting a pixel value, determining the scanner noise free measure for the pixel based on the iterative scan data for an actual or test filmstrip, and writing the noise free measure as a replacement value for the pixel value. Pixel values can be separated into various luma and chroma elements and handled separately. In an alternative, or in addition, composite values may be computed.

The apparatus or system 2900 may further comprise an electrical component 2906 for saving the scanner noise reduced digital image in a computer memory. The component 2906 may be, or may include, a means for said saving. Said means may include the processor 29 coupled to the memory 2916, the processor executing an algorithm based on program instructions stored in the memory. Such algorithm may include a sequence of more detailed operations, sending a value to the memory with instructions to store the value in a memory structure.

The apparatus 2900 may optionally include a processor module 2910 having at least one processor, in the case of the apparatus 2900 configured as a data processor. The processor 2910, in such case, may be in operative communication with the modules 2902-2906 via a bus 2912 or other communication coupling, for example, a network. The processor 2910 may initiate and schedule the processes or functions performed by electrical components 2902-2906.

In related aspects, the apparatus 2900 may include a scanner device 2914 for film stock, as previously described. The apparatus may further include a network interface module (not shown) operable for communicating with a storage device over a computer network. In further related aspects, the apparatus 2900 may optionally include a module for storing information, such as, for example, a memory device/module 2916. The computer readable medium or the memory module 2916 may be operatively coupled to the other components of the apparatus 2900 via the bus 2912 or the like. The memory module 2916 may be adapted to store computer readable instructions and data for effecting the processes and behavior of the modules 2902-2906, and subcomponents thereof, or the processor 2910, or the methods 2600, 2700, 2800 and one or more of the additional operations described in connection therewith. The memory module 2916 may retain instructions for executing functions associated with the modules 2902-2906. While shown as being external to the memory 2916, it is to be understood that the modules 2902-2906 can exist within the memory 2916.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Program instructions may be written in any suitable high-level language, for example, C, C++, C#, JavaScript, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether machine code on the bundle can be executed independently of other machine code. In other words, the modules may be high-level modules only.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. As used herein, a "processor" encompasses any one or functional combination of the foregoing examples.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for preparing digital image data from an analog image input, the method comprising:
scanning, by an analog-to-digital image scanner, an analog image for multiple iterations, resulting in digital image data for each of the iterations;
calculating, by at least one processor, a noise statistic for scanner noise of individual pixels of the digital image data across the iterations;
determining, by the at least one processor, true values of individual pixels of the digital image data based on the noise statistic for each of the individual pixels and generating scanner noise reduced digital image data wherein pixels are assigned their respective ones of the true values; and
saving the scanner noise reduced digital image data in a computer memory.

2. The method of claim 1, wherein calculating the noise statistic comprises calculating at least one of a median or average value.

3. The method of claim 1, further comprising determining, by the at least one processor whether scanner noise in the scanner noise reduced digital image data is below a specified threshold.

4. The method of claim 3, further comprising, only if the scanner noise in the scanner noise reduced digital image data is not below the specified threshold, repeating all operations of claim 1 for the analog image using a greater number of iterations than previously used for the same analog image.

5. The method of claim 3, further comprising, only if the scanner noise in the scanner noise reduced digital image data is not above the specified threshold, indicating the scanner noise reduced digital image data in the computer memory is satisfactory for use.

6. The method of claim 5, further comprising repeating the operations of claim 1 for a sequence of frames resulting in a sequence of scanner noise reduced digital image data in the memory indicated as satisfactory for use, converting the scanner noise reduced digital image data to a digital video file, and storing the digital video file in a computer memory.

7. The method of claim 1, further comprising determining a number of the multiple iterations for the scanning.

8. The method of claim 7, further comprising, by the at least one processor, analyzing a visibility of scanner noise based at least in part on a difference between the statistical measure and the true value of the individual pixels.

9. The method of claim 8, further comprising calculating a Just Noticeable Difference (JND) measure for the pixel area based on the Barton modulation threshold, the minimum, maximum and average luminance values, and the average noise magnitude.

10. The method of claim 7, further comprising converting a selected pixel area of the digital image data for each of the iterations to the frequency domain and analyzing pixel luminance in the frequency domain, and determining minimum, maximum, and average luminance for the pixel area.

11. The method of claim 10, wherein the number of multiple iterations is a function of the JND.

12. An apparatus for preparing digital image data from an analog image input, comprising at least one processor coupled to a memory and to an image scanning device, the memory holding instructions, that when executed by the at least one processor, causes the apparatus to perform:
scanning an analog image for multiple iterations, resulting in digital image data for each of the iterations;
calculating a noise statistic for scanner noise of individual pixels of digital the image data across the iterations;
determining true values of individual pixels of the digital image data based on the noise statistic for each of the individual pixels and generating scanner noise reduced digital image data wherein pixels are assigned their respective ones of the true values; and
saving the scanner noise reduced digital image in a computer memory.

13. The apparatus of claim 12, wherein the memory holds further instructions for determine whether scanner noise in the scanner noise reduced digital image data is below a visible threshold.

14. The apparatus of claim 13, wherein the memory holds further instructions for, only if the scanner noise in the scanner noise reduced digital image data is not below the specified threshold, repeating all operations of claim 12 for the analog image using a greater number of iterations than previously used for the same analog image, and, only if the scanner noise in the scanner noise reduced digital image data is not above the specified threshold, indicating the scanner noise reduced digital image data in the computer memory is satisfactory for use.

15. The apparatus of claim 14, wherein the memory holds further instructions for repeating the operations of claim 12 for a sequence of frames resulting in a sequence of scanner noise reduced digital image data in the memory indicated as satisfactory for use, converting the scanner noise reduced digital image data to a digital video file, and storing the digital video file in a computer memory.

16. The apparatus of claim 12, wherein the memory holds further instructions for, by the at least one processor, analyzing a visibility of scanner noise based at least in part on a difference between the statistical measure and the true value of the individual pixels.

17. The apparatus of claim 16, wherein the memory holds further instructions for converting a selected pixel area of the digital image data for each of the iterations to the frequency domain and analyzing pixel luminance in the frequency domain, and determining minimum, maximum, and average luminance for the pixel area, and calculating a Just Noticeable Difference (JND) measure for the pixel area based on the Barton modulation threshold, the minimum, maximum and average luminance values, and the average noise magnitude.

18. A method for remastering a cinematic title, the method comprising:
scanning a test film strip, by an analog-to-digital image scanner, for multiple iterations, resulting in digital image data for each of the iterations;
calculating, by at least one processor, a noise statistic for individual pixels of digital image data across the iterations; and
storing the noise statistic in a computer memory associated with the scanner.

19. The method of claim 18, further comprising:
scanning a film strip of the cinematic title by the analog-to-digital scanner, resulting in digital image data of the cinematic title;
determining, by the at least one processor, true values of individual pixels of the digital image data based on the noise statistic for each of the individual pixels and generating scanner noise reduced digital image data wherein pixels are assigned their respective ones of the true values; and
saving the scanner noise reduced digital image in a computer memory.

20. The method of claim 18, further comprising:
selecting a film strip for remastering based on the calculated noise statistic.

* * * * *